United States Patent
Bai et al.

(10) Patent No.: US 11,734,147 B2
(45) Date of Patent: Aug. 22, 2023

(54) PREDICTIVE PERFORMANCE ANALYSIS FOR FILE SYSTEMS

(71) Applicant: Qumulo, Inc., Seattle, WA (US)

(72) Inventors: Yuxi Bai, Seattle, WA (US); Thomas Gregory Rothschilds, Seattle, WA (US); Jonathan Michael MacLaren, Seattle, WA (US); Noah Trent Nelson, Seattle, WA (US); Kimberly Alice Fairhurst, Seattle, WA (US)

(73) Assignee: Qumulo Inc., Seattle, WA (US)

( * ) Notice: Subject to any disclaimer, the term of this patent is extended or adjusted under 35 U.S.C. 154(b) by 0 days.

(21) Appl. No.: 17/062,500

(22) Filed: Oct. 2, 2020

(65) Prior Publication Data

US 2021/0232481 A1     Jul. 29, 2021

Related U.S. Application Data

(63) Continuation of application No. 16/752,451, filed on Jan. 24, 2020, now Pat. No. 10,795,796.

(51) Int. Cl.
    *G06F 11/34*     (2006.01)
    *G06F 11/07*     (2006.01)
    (Continued)

(52) U.S. Cl.
    CPC ...... *G06F 11/3457* (2013.01); *G06F 11/0727* (2013.01); *G06F 11/3065* (2013.01);
    (Continued)

(58) Field of Classification Search
    CPC ............. G06F 11/3457; G06F 11/3452; G06F 11/3447; G06F 11/0727; G06F 11/3065;
    (Continued)

(56) References Cited

U.S. PATENT DOCUMENTS 5,165,031 A    11/1992   Pruul et al.
5,283,875 A    2/1994    Gibson et al.
(Continued)

FOREIGN PATENT DOCUMENTS

EP     1217551 A2    6/2002
EP     1498829 A1    1/2005
(Continued)

OTHER PUBLICATIONS

Office Communication for U.S. Appl. No. 16/004,182 dated Nov. 30, 2020, pp. 1-55.
(Continued)

*Primary Examiner* — Juan C Ochoa
(74) *Attorney, Agent, or Firm* — John W. Branch; Branch Partners PLLC

(57) ABSTRACT

Embodiments are directed to managing file systems over a network. A core specification that defines characteristics of a portion of a file system and parameters may be provided. The characteristics may include one or more storage device characteristics. And, the parameters may include one or more of a cluster size, or a protection level. File system models may be generated based on the core specification and the parameters. Each file system model may correspond to a file system that conforms to a core specification and specific values for the parameters. A simulation engine may be employed to provide simulation results based on the file system models. Deployment models may be generated based on the simulation results. The deployment models may be employed to provision file systems that conform to the file system performance characteristics associated with its corresponding deployment model.

20 Claims, 11 Drawing Sheets

(51) Int. Cl.
  *G06F 17/18* (2006.01)
  *G06F 11/30* (2006.01)
(52) U.S. Cl.
  CPC ...... *G06F 11/3447* (2013.01); *G06F 11/3452* (2013.01); *G06F 17/18* (2013.01)
(58) Field of Classification Search
  CPC ...... G06F 17/18; G06F 9/4881; G06F 16/122; G06F 9/4818; G06F 11/3058; G06F 11/3409; G06F 16/11
  USPC .......................................................... 703/21
  See application file for complete search history.

(56) References Cited

U.S. PATENT DOCUMENTS

| | | |
|---|---|---|
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 * | 12/2008 | Keeton ............... G06F 11/261 714/41 |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,958,304 B1 | 6/2011 | Goel et al. |
| 7,962,709 B2 | 6/2011 | Agrawal |
| 7,966,293 B1 | 6/2011 | Owara et al. |
| 8,027,827 B2 * | 9/2011 | Bitar ............... G06F 11/3457 703/21 |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 * | 9/2017 | Brow ................... G06F 16/113 |
| 9,753,987 B1 * | 9/2017 | Dolan .................. G06F 16/182 |
| 9,785,377 B2 | 10/2017 | Shin et al. |
| 9,846,698 B1 | 12/2017 | Panidis et al. |
| 10,140,185 B1 | 11/2018 | Lopez et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,339,101 B1 | 7/2019 | Gupta |
| 10,423,609 B1 | 9/2019 | Strauss |
| 10,437,509 B1 | 10/2019 | Alexeev et al. |
| 10,447,779 B2 | 10/2019 | Dieterich et al. |
| 10,474,635 B1 * | 11/2019 | Unger ................... G06N 20/00 |
| 10,534,758 B1 * | 1/2020 | Carpenter ............. G06F 3/0685 |
| 10,540,662 B2 * | 1/2020 | Barlett .................. G06F 21/577 |
| 10,545,986 B2 | 1/2020 | Tappan et al. |
| 10,621,057 B2 | 4/2020 | Tripathi et al. |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,725,977 B1 | 7/2020 | Chmiel et al. |
| 10,795,796 B1 | 10/2020 | Bai et al. |
| 10,860,546 B2 | 12/2020 | Ye et al. |
| 11,023,535 B1 | 6/2021 | Greenwood et al. |
| 11,150,823 B2 | 10/2021 | Gao et al. |
| 11,157,458 B1 | 10/2021 | Carter et al. |
| 11,265,262 B1 | 3/2022 | Makie et al. |
| 11,630,832 B2 | 4/2023 | Choi et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1 | 8/2005 | Land et al. |
| 2005/0195660 A1 | 9/2005 | Kavuri et al. |
| 2005/0223019 A1 | 10/2005 | Das et al. |
| 2006/0004890 A1 | 1/2006 | Semple et al. |

(56) References Cited

U.S. PATENT DOCUMENTS

| | | |
|---|---|---|
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0061783 A1 | 3/2007 | Prakash |
| 2007/0100855 A1 | 5/2007 | Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1* | 11/2010 | Jernigan, IV ......... G06F 3/0608 |
| | | 711/114 |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1* | 12/2013 | Bachar ................. G06F 16/128 |
| | | 707/640 |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1* | 1/2015 | Pannese ................. H04L 61/15 |
| | | 709/248 |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0034481 A1 | 2/2016 | Kumarasamy et al. |
| 2016/0110105 A1 | 4/2016 | Karamcheti et al. |
| 2016/0139836 A1 | 5/2016 | Nallathambi et al. |
| 2016/0139952 A1 | 5/2016 | Geng et al. |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0024152 A1 | 1/2017 | Bhagi et al. |
| 2017/0032006 A1 | 2/2017 | Anglin et al. |

(56) References Cited

U.S. PATENT DOCUMENTS

| | | |
|---|---|---|
| 2017/0046143 A1 | 2/2017 | Kochhar et al. |
| 2017/0052898 A1 | 2/2017 | Ash et al. |
| 2017/0078164 A1* | 3/2017 | Hildebrand ......... G06F 11/3447 |
| 2017/0091046 A1 | 3/2017 | Bangalore et al. |
| 2017/0118287 A1 | 4/2017 | Beck |
| 2017/0123883 A1* | 5/2017 | Hall ................... G06F 11/0727 |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1* | 11/2017 | Constantinescu ... G06F 16/1748 |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0203798 A1 | 7/2018 | Hughes et al. |
| 2018/0276078 A1 | 9/2018 | Blea et al. |
| 2018/0288057 A1 | 10/2018 | Varadamma et al. |
| 2018/0314423 A1* | 11/2018 | Gong ................... G06F 3/0689 |
| 2018/0357291 A1 | 12/2018 | Choi et al. |
| 2018/0365115 A1 | 12/2018 | Fang et al. |
| 2019/0087770 A1 | 3/2019 | Walsh et al. |
| 2019/0095112 A1 | 3/2019 | Lingarajappa |
| 2019/0102700 A1* | 4/2019 | Babu ...................... G06N 5/025 |
| 2019/0163589 A1 | 5/2019 | McBride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0286521 A1 | 9/2019 | Okpotse et al. |
| 2019/0286528 A1 | 9/2019 | Wu et al. |
| 2019/0384640 A1 | 12/2019 | Swamy et al. |
| 2020/0004977 A1* | 1/2020 | Araujo ................ G06F 16/1734 |
| 2020/0026438 A1 | 1/2020 | Peleg et al. |
| 2020/0034077 A1 | 1/2020 | Haravu et al. |
| 2020/0050391 A1 | 2/2020 | Meyerowitz et al. |
| 2020/0142878 A1 | 5/2020 | Varadarajan et al. |
| 2020/0174692 A1 | 6/2020 | Dave et al. |
| 2020/0242075 A1 | 7/2020 | Davis et al. |
| 2020/0286270 A1 | 9/2020 | Lymperopoulos et al. |
| 2020/0341689 A1 | 10/2020 | Smith |
| 2020/0387315 A1 | 12/2020 | Stems et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0191650 A1 | 6/2021 | Vansteenkiste et al. |
| 2021/0240393 A1 | 8/2021 | Jo et al. |
| 2021/0240678 A1 | 8/2021 | Patel et al. |
| 2021/0279187 A1 | 9/2021 | Puder et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0035831 A1 | 2/2022 | Beers |
| 2022/0058055 A1 | 2/2022 | Amemiya et al. |
| 2022/0066882 A1 | 3/2022 | Wang et al. |
| 2022/0091739 A1 | 3/2022 | Kumar et al. |
| 2022/0107729 A1 | 4/2022 | Hua |
| 2022/0124152 A1 | 4/2022 | Gallego et al. |
| 2023/0057068 A1 | 2/2023 | Bhandarkar et al. |
| 2023/0057600 A1 | 2/2023 | Malley et al. |

FOREIGN PATENT DOCUMENTS

| | | |
|---|---|---|
| WO | 1999044145 A1 | 9/1999 |
| WO | 0072201 A1 | 11/2000 |
| WO | 2009007250 A2 | 1/2009 |
| WO | 2012029259 A1 | 3/2012 |

OTHER PUBLICATIONS

Office Communication for U.S. Appl. No. 16/883,922 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Office Communication for U.S. Appl. No. 16/226,587 dated Aug. 5, 2019, pp. 1-54.
Office Communication for U.S. Appl. No. 16/228,716 dated Jun. 24, 2019, pp. 1-28.
Office Communication for U.S. Appl. No. 16/231,354 dated Jul. 10, 2019, pp. 1-16.
Office Communication for U.S. Appl. No. 16/262,756 dated Aug. 5, 2019, pp. 1-48.
Office Communication for U.S. Appl. No. 15/967,499 dated Jun. 27, 2018, pp. 1-25.
Office Communication for U.S. Appl. No. 16/226,587 dated Feb. 25, 2019, pp. 1-65.
Office Communication for U.S. Appl. No. 16/228,716 dated Feb. 28, 2019, pp. 1-28.
Office Communication for U.S. Appl. No. 16/231,354 dated Mar. 25, 2019, pp. 1-19.
Office Communication for U.S. Appl. No. 16/262,756 dated Apr. 2, 2019, pp. 1-40.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/262,756 dated Oct. 25, 2019, pp. 1-6.
Office Communication for U.S. Appl. No. 16/659,488 dated Dec. 30, 2019, pp. 1-35.
Office Communication for U.S. Appl. No. 14/595,598 dated Dec. 31, 2019, pp. 1-23.
Office Communication for U.S. Appl. No. 16/004,208 dated Aug. 27, 2018, pp. 1-11.
Office Communication for U.S. Appl. No. 16/234,395 dated Aug. 8, 2019, pp. 1-28.

(56) References Cited

OTHER PUBLICATIONS

Office Communication for U.S. Appl. No. 16/234,334 dated Apr. 5, 2019, pp. 1-24.
Office Communication for U.S. Appl. No. 16/234,395 dated Mar. 28, 2019, pp. 1-36.
Kappes et al. "Dike: Virtualization-aware Access Control for Multitenant Filesystems", Feb. 18, 2013, pp. 1-6.
Hitz et al. "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-22.
Office Communication for U.S. Appl. No. 15/473,051 dated Jun. 30, 2017, pp. 1-22.
Extended european Search Report for european Patent Application No. 18155779.4 dated Apr. 17, 2018, pp. 1-15.
Office Communication for U.S. Appl. No. 16/004,182 dated Aug. 23, 2018, pp. 1-46.
Office Communication for U.S. Appl. No. 16/004,182 dated Mar. 5, 2019, pp. 1-46.
Office Communication for U.S. Appl. No. 16/004,182 dated Jul. 3, 2019, pp. 1-50.
Office Communication for U.S. Appl. No. 15/694,604 dated Jun. 3, 2019, pp. 1-14.
Office Communication for U.S. Appl. No. 16/004,182 dated May 22, 2019, pp. 1-6.
Office Communication for U.S. Appl. No. 14/595,043 dated May 4, 2017, pp. 1-38.
Office Communication for U.S. Appl. No. 14/595,043 dated Feb. 23, 2018, pp. 1-22.
Office Communication for U.S. Appl. No. 14/595,043 dated May 25, 2018, pp. 1-14.
Office Communication for U.S. Appl. No. 14/595,043 dated Oct. 5, 2018, pp. 1-26.
Office Communication for U.S. Appl. No. 14/595,043 dated Jun. 7, 2019, pp. 1-29.
Office Communication for U.S. Appl. No. 14/595,043 dated Aug. 27, 2019, pp. 1-34.
Office Communication for U.S. Appl. No. 14/658,015 dated Apr. 27, 2017, pp. 1-8.
Office Communication for U.S. Appl. No. 14/658,015 dated Jan. 4, 2018, pp. 1-35.
Office Communication for U.S. Appl. No. 14/658,015 dated Jul. 13, 2018, pp. 1-18.
Office Communication for U.S. Appl. No. 14/859,061 dated Sep. 22, 2017, pp. 1-29.
Office Communication for U.S. Appl. No. 15/831,236 dated Mar. 30, 2018, pp. 1-8.
Office Communication for U.S. Appl. No. 15/831,236 dated Aug. 15, 2018, pp. 1-27.
Office Communication for U.S. Appl. No. 14/859,114 dated Jul. 24, 2017, pp. 1-165.
Office Communication for U.S. Appl. No. 14/859,114 dated Feb. 21, 2018, pp. 1-27.
Office Communication for U.S. Appl. No. 14/859,114 dated May 11, 2018, pp. 1-7.
Office Communication for U.S. Appl. No. 14/859,114 dated Jun. 27, 2018, pp. 1-40.
Office Communication for U.S. Appl. No. 14/859,114 dated Nov. 19, 2018, pp. 1-41.
Office Communication for U.S. Appl. No. 14/859,114 dated Jan. 31, 2019, pp. 1-5.
Office Communication for U.S. Appl. No. 14/859,114 dated Mar. 7, 2019, pp. 1-39.
Office Communication for U.S. Appl. No. 14/859,114 dated Jun. 26, 2019, pp. 1-66.
Office Communication for U.S. Appl. No. 14/859,114 dated Sep. 13, 2019, pp. 1-8.
Office Communication for U.S. Appl. No. 14/859,114 dated Nov. 26, 2019, pp. 1-43.
Office Communication for U.S. Appl. No. 15/288,853 dated Sep. 19, 2018, pp. 1-27.
Chimera, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-25.
Cudre-Mauroux, et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-22.
Office Communication for U.S. Appl. No. 15/474,047 dated Sep. 18, 2017, pp. 1-24.
Office Communication for U.S. Appl. No. 15/474,047 dated Mar. 9, 2018, pp. 1-12.
Office Communication for U.S. Appl. No. 15/474,047 dated Jun. 11, 2018, pp. 1-7.
Office Communication for U.S. Appl. No. 15/474,047 dated Aug. 15, 2018, pp. 1-24.
Office Communication for U.S. Appl. No. 15/957,809 dated Jun. 28, 2018, pp. 1-42.
Office Communication for U.S. Appl. No. 15/957,809 dated Jan. 24, 2019, pp. 1-24.
Office Communication for U.S. Appl. No. 16/434,157 dated Jul. 25, 2019, pp. 1-16.
Office Communication for U.S. Appl. No. 15/854,447 dated May 6, 2019, pp. 1-31.
Office Communication for U.S. Appl. No. 16/505,562 dated Aug. 30, 2019, pp. 1-46.
Extended European Search Report for European Patent Application No. 17206518.7 dated Apr. 5, 2018, pp. 1-8.
Karatza et al. "Epoch load sharing in a network of workstations," Simulation Symposium, 2001. Proceedings. 34th Annual Apr. 22-26, 2001, Piscataway, NJ, USA, IEEE, Apr. 22, 2001 (Apr. 22, 2001), pp. 36-42, XP010541274, ISBN: 973-0-7695-1092-7.
Office Communication for U.S. Appl. No. 16/004,182 dated Jan. 7, 2020, pp. 1-54.
Office Communication for U.S. Appl. No. 16/125,573 dated Nov. 21, 2019, pp. 1-24.
Office Communication for U.S. Appl. No. 16/226,587 dated Oct. 24, 2019, pp. 1-6.
Office Communication for U.S. Appl. No. 16/262,790 dated Dec. 12, 2019, pp. 1-23.
Office Communication for U.S. Appl. No. 16/234,334 dated Jan. 16, 2020, pp. 1-8.
Office Communication for U.S. Appl. No. 15/694,604 dated Nov. 20, 2019, pp. 1-24.
Office Communication for U.S. Appl. No. 16/262,756 dated Jan. 23, 2020, pp. 1-27.
Office Communication for U.S. Appl. No. 16/434,157 dated Jan. 29, 2020, pp. 1-12.
Office Communication for U.S. Appl. No. 16/262,790 dated Feb. 6, 2020, pp. 1-8.
Office Communication for U.S. Appl. No. 14/659,114 dated Mar. 13, 2020, pp. 1-22.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_ science) (Year: 2019), pp. 1-4.
Office Communication for U.S. Appl. No. 16/004,182 dated Mar. 23, 2020, pp. 1-6.

(56) References Cited

OTHER PUBLICATIONS

Office Communication for U.S. Appl. No. 16/752,509 dated Apr. 2, 2020, pp. 1-42.
Office Communication for U.S. Appl. No. 16/152,277 dated Apr. 3, 2020, pp. 1-10.
Office Communication for U.S. Appl. No. 16/004,182 dated Apr. 28, 2020, pp. 1-52.
Office Communication for U.S. Appl. No. 16/152,259 dated Apr. 29, 2020, pp. 1-19.
Office Communication for U.S. Appl. No. 14/859,114 dated Jun. 5, 2020, pp. 1-6.
Office Communication for U.S. Appl. No. 16/262,756 dated Jun. 8, 2020, pp. 1-43.
Office Communication for U.S. Appl. No. 14/595,598 dated Jul. 9, 2020, pp. 1-26.
Office Communication for U.S. Appl. No. 16/752,451 dated Jul. 23, 2020, pp. 1-31.
Office Communication for U.S. Appl. No. 14/859,114 dated Jul. 23, 2020, pp. 1-28.
Office Communication for U.S. Appl. No. 16/152,615 dated Aug. 6, 2020, pp. 1-18.
Office Communication for U.S. Appl. No. 16/779,362 dated Aug. 7, 2020, pp. 1-33.
Office Communication for U.S. Appl. No. 16/883,922 dated Aug. 7, 2020, pp. 1-18.
Office Communication for U.S. Appl. No. 16/775,041 dated Aug. 18, 2020, pp. 1-17.
Office Communication for U.S. Appl. No. 16/883,879 dated Sep. 1, 2020, pp. 1-18.
Extended European Search Report for European Patent Application No. 1681258.14 dated Nov. 7, 2018, pp. 1-9.
Comer, Douglas, "The Ubiquitous B-Tree," Computing Surveys, vol. 11, No. 2, Jun. 1979, Computer Science Department, Purdue University, West Lafayette, Indiana 47907, pp. 121-137.
Office Communication for European Patent Application No. 16812585.4 dated Jan. 2, 2020, pp. 1-6.
International Search Report and Written Opinion for Application No. PCT/US2018/38242 dated on Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-3.
Bloom, Burton H. "Space/Time Trade-offs in Hash Coding with Allowable Errors," Communications of the ACM, vol. 13, No. 7, Jul. 1970. Computer Usage Company, Newton Upper Fats, Massachusettes, pp. 422-426.
Office Communication for U.S. Appl. No. 16/262,756 dated Aug. 24, 2020, pp. 1-21.
Office Communication for European Patent Application No. 18155779.4 dated on Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Extended European Search Report for European Patent Application No. 18155779.4 dated Apr. 17, 2018, pp. 1-15.
Office Communication for U.S. Appl. No. 16/262,756 dated Jan. 28, 2020, pp. 1-27.
Office Communication for U.S. Appl. No. 14/859,114 dated Mar. 13, 2020, pp. 1-22.
Extended European Search Report for European Patent Application No. 16812585.4 dated Nov. 7, 2018, pp. 1-9.
International Search Report and Written Opinion for Application No. PCT/US2016038242 dated on Oct. 11, 2016, pp. 1-11.
Office Communication for European Patent Application No. 18155779.4 dated Oct. 8, 2019, pp. 1-4.
Office Communication for U.S. Appl. No. 16/152,277 dated Dec. 28, 2020, pp. 1-5.
Office Communication for U.S. Appl. No. 16/004,182 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 17/114,384 dated Feb. 10, 2021, pp. 1-19.
Office Communication for U.S. Appl. No. 17/114,384 dated Feb. 17, 2021, pp. 1-12.
Office Communication for U.S. Appl. No. 17/203,452 dated Jun. 23, 2021, pp. 1-11.
Office Communication for U.S. Appl. No. 16/152,277 dated Jun. 25, 2021, pp. 1-10.
Office Communication for U.S. Appl. No. 16/004,182 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 16/775,041 dated Jul. 21, 2021, pp. 1-11.
Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/190,653 dated Aug. 27, 2021, pp. 1-11.
Office Communication for U.S. Appl. No. 17/114,384 dated Sep. 2, 2021, pp. 1-5.
Office Communication for U.S. Appl. No. 16/152,277 dated Sep. 3, 2021, pp. 1-4.
Office Communication for U.S. Appl. No. 16/004,182 dated Sep. 10, 2021, pp. 1-4.
Office Communication for U.S. Appl. No. 16/004,182 dated Sep. 29, 2021, pp. 1-11.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 14/595,598 dated Oct. 28, 2021, pp. 1-6.
Office Communication for U.S. Appl. No. 16/741,567 dated Oct. 28, 2021, pp. 1-11.
Office Communication for U.S. Appl. No. 17/203,452 dated Nov. 2, 2021, pp. 1-13.
Office Communication for U.S. Appl. No. 17/190,653 dated Nov. 10, 2021, pp. 1-6.
Office Communication for U.S. Appl. No. 17/484,167 dated Nov. 18, 2021, pp. 1-15.
Office Communication for U.S. Appl. No. 17/504,289 dated Dec. 7, 2021, pp. 1-15.
Office Communication for U.S. Appl. No. 17/114,384 dated Dec. 14, 2021, pp. 1-7.

(56) References Cited

OTHER PUBLICATIONS

Office Communication for U.S. Appl. No. 17/190,653 dated Dec. 21, 2021, pp. 1-12.
Office Communication for U.S. Appl. No. 17/508,869 dated Dec. 22, 2021, pp. 1-9.
Office Communication for U.S. Appl. No. 17/491,017 dated Dec. 23, 2021, pp. 1-41.
Office Communication for U.S. Appl. No. 14/595,598 dated Dec. 29, 2021, pp. 1-19.
Office Communication for U.S. Appl. No. 16/741,567 dated Jan. 11, 2022, pp. 1-6.
Office Communication for U.S. Appl. No. 17/203,452 dated Jan. 14, 2022, pp. 1-4.
Office Communication for U.S. Appl. No. 17/510,043 dated Jan. 21, 2022, pp. 1-13.
Office Communication for U.S. Appl. No. 17/115,529 mailed Aug. 12, 2021, pp. 1-4.
Office Communication for U.S. Appl. No. 16/004,132 dated Sep. 10, 2021, pp. 1-4.
Office Communication for U.S. Appl. No. 17/190,653 dated Nov. 2, 2021, pp. 1-13.
Office Communication for U.S. Appl. No. 17/510,043 dated Jan. 21, 2022, pp. 1-13.
Office Communication for U.S. Appl. No. 17/504,289 dated Mar. 28, 2022, pp. 1-9.
Office Communication for U.S. Appl. No. 17/588,120 dated Apr. 11, 2022, pp. 1-36.
Office Communication for U.S. Appl. No. 17/588,895 dated Apr. 27, 2022, pp. 1-6.
Office Communication for U.S. Appl. No. 17/190,653 dated Apr. 28, 2022, pp. 1-13.
Office Communication for U.S. Appl. No. 17/510,043 dated Apr. 29, 2022, pp. 1-10.
Office Communication for U.S. Appl. No. 17/115,529 dated Apr. 29, 2022, pp. 1-4.
Office Communication for U.S. Appl. No. 17/491,017 dated May 12, 2022, pp. 1-50.
Office Communication for U.S. Appl. No. 17/484,167 dated May 17, 2022, pp. 1-3.
Office Communication for U.S. Appl. No. 17/484,167 dated Jun. 10, 2022, pp. 1-5.
Office Communication for U.S. Appl. No. 17/203,452 dated Jun. 22, 2022, pp. 1-22.
Office Communication for U.S. Appl. No. 16/741,567 dated Feb. 7, 2022, pp. 1-8.
Office Communication for U.S. Appl. No. 17/530,420 dated Feb. 10, 2022, pp. 1-24.
Office Communication for U.S. Appl. No. 16/004,182 dated Feb. 18, 2022, pp. 1-11.
Office Communication for U.S. Appl. No. 17/115,529 dated Feb. 18, 2022, pp. 1-20.
Office Communication for U.S. Appl. No. 17/203,452 dated Feb. 24, 2022, pp. 1-14.
Office Communication for U.S. Appl. No. 17/484,167 dated Mar. 11, 2022, pp. 1-11.
Office Communication for U.S. Appl. No. 14/595,598 dated Jul. 13, 2022, pp. 1-9.
Office Communication for U.S. Appl. No. 17/588,120 dated Jul. 27, 2022, pp. 1-34.
Office Communication for U.S. Appl. No. 17/190,653 dated Aug. 2, 2022, pp. 1-8.
Office Communication for U.S. Appl. No. 17/115,529 dated Aug. 8, 2022, pp. 1-21.
Office Communication for U.S. Appl. No. 17/588,895 dated Aug. 12, 2022, pp. 1-12.
Office Communication for U.S. Appl. No. 17/491,017 dated Aug. 17, 2022, pp. 1-5.
Office Communication for U.S. Appl. No. 17/203,452 dated Sep. 8, 2022, pp. 1-4.
Office Communication for U.S. Appl. No. 17/491,017 dated Sep. 15, 2022, pp. 1-55.
Office Communication for U.S. Appl. No. 17/864,190 dated Sep. 19, 2022, pp. 1-10.
Office Communication for U.S. Appl. No. 17/203,452 dated Oct. 19, 2022, pp. 1-9.
Office Communication for U.S. Appl. No. 17/588,120 dated Oct. 21, 2022, pp. 1-5.
Office Communication for U.S. Appl. No. 17/203,452 dated Nov. 9, 2022, pp. 1-2.
Office Communication for U.S. Appl. No. 17/588,895 dated Nov. 9, 2022, pp. 1-11.
Office Communication for U.S. Appl. No. 17/954,640 dated Nov. 30, 2022, pp. 1-10.
Office Communication for U.S. Appl. No. 17/115,529 dated Dec. 9, 2022, pp. 1-21.
Office Communication for U.S. Appl. No. 17/864,190 dated Jan. 24, 2023, pp. 1-2.
Office Communication for U.S. Appl. No. 17/588,120 dated Feb. 1, 2023, pp. 1-15.
Office Communication for U.S. Appl. No. 17/491,017 dated Feb. 10, 2023, pp. 1-57.
Office Communication for U.S. Appl. No. 18/070,705 dated Feb. 23, 2023, pp. 1-57.
Office Communication for U.S. Appl. No. 17/954,640 dated Mar. 15, 2023, pp. 1-9.
Office Communication for U.S. Appl. No. 17/864,190 dated Apr. 28, 2023, pp. 1-5.
Office Communication for U.S. Appl. No. 17/491,017 dated May 4, 2023, pp. 1-6.
Office Communication for U.S. Appl. No. 17/973,944 dated May 10, 2023, pp. 1-9.
Office Communication for U.S. Appl. No. 17/115,529 dated May 22, 2023, pp. 1-25.

* cited by examiner

US 11,734,147 B2

PREDICTIVE PERFORMANCE ANALYSIS FOR FILE SYSTEMS

CROSS-REFERENCE TO RELATED APPLICATIONS

This Utility Patent Application is a Continuation of U.S. patent application Ser. No. 16/752,451 filed on Jan. 24, 2020, now U.S. Pat. No. 10,795,796 issued on Oct. 6, 2020, the benefit of the filing date of which is hereby claimed under 35 U.S.C. § 120 and the contents of which is further incorporated in entirety by reference.

TECHNICAL FIELD

The present invention relates generally to file systems, and more particularly, but not exclusively, to managing resource provisioning for distributed file systems.

BACKGROUND

Modern computing often requires the collection, processing, or storage of very large data sets or files. Accordingly, to accommodate the capacity requirements as well as other requirements, such as, high availability, redundancy, latency/access considerations, or the like, modern file systems may be very large or distributed across multiple hosts, networks, or data centers, and so on. In many cases, distributed file systems may be comprised of many storage devices (e.g., hard drives, solid state drives, or the like) that may independently experience failures. Accordingly, many file systems may employ protection/recovery schemes that enable recovery from some amount of device failures. However, the complexity or variability of various deployment configurations that may be required in production environments may make it difficult to predict performance/reliability metrics or provide guarantees thereof. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
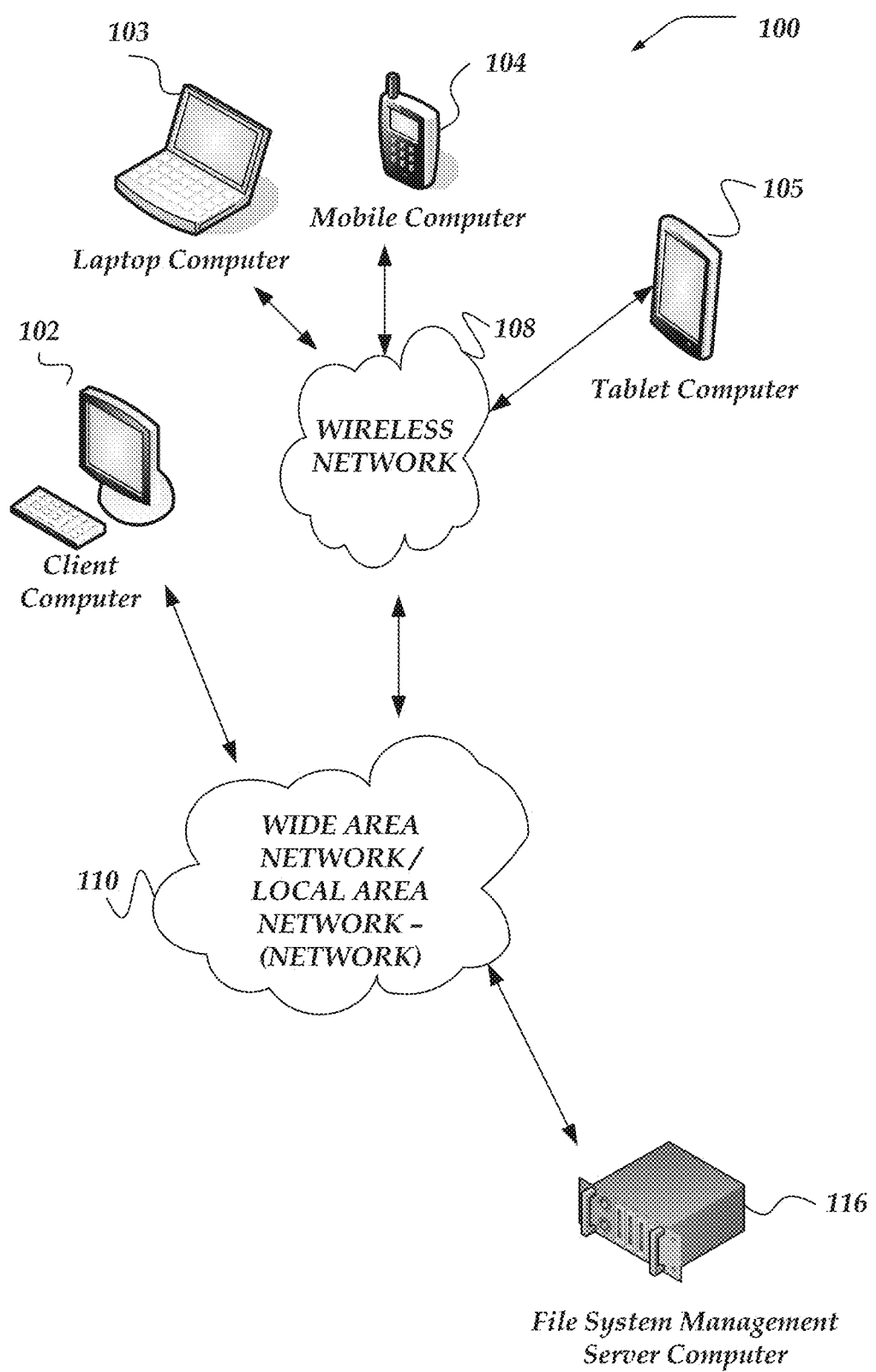
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file systems may be referred to as file system objects.

As used herein the term "file system" refers to storage systems that may include one or more storage devices, one or more servers, one or more nodes, or the like. Typically, file systems may be arranged to support one or more conventional/standards-based file system protocols, or the like. In some cases, file system may be distributed across multiple nodes, servers, networks, or the like.

As used herein the term "storage unit" refers to storage component in a file system. Accordingly, storage devices, storage enclosures, cluster nodes, clusters, or the like, be considered storage units. The particular component represented by a storage unit may depend on context. For example, in some cases, a single hard drive may be considered a storage unit, where in other cases, a node computer in distributed file system may be considered a single storage unit, even though the node computer may include server hard drives, solid state drives, or the like.

As used herein the term "protection level" refers to a number of storage units that can fail without causing data loss. If the protection level for a file system is two, two storage units in the file may fail at the same time without incurring data loss. For example, in some local file systems, the storage units may be hard drives or solid state drives, or the like. In a distributed file system, the storage units may be node computers (each having multiple storage devices). In a server with a large file system, storage units may be external enclosures, each with many storage devices.

As used herein the term "core specification" refers to information associated with a description of the features, technical specification, device type, or the like, associated with a portion of a file system. In some circumstances, core specifications may be associated with specific product offerings (e.g., SKUs, or the like). Core specification may include or reference various information, such as, storage device specifications, make/model information, or the like. In some cases, information referred to in a core specification may be provided by external sources, such as, manufacturers, OEMs, standards bodies, or the like. Accordingly, file system specifications may be comprised of a core specification plus one or more additional performance or configuration parameters, such as, node counts, protection levels, or the like.

As used herein the term "file system model" refers to one or more data structures that may be arranged to include one or more heuristics, formulas, states, transitions, success parameters, failure parameter, risk probabilities, or the like, that may be employed for predictive performance analysis for file systems. File system models may be provided to simulation engines to simulate the performance of the models file system. In some cases, portions of a file system model may be designed such that various parameters or condition rules may be "plugged" into the model to specialize a generic (or partially generic) file system model.

As used herein the term "deployment model" refers to one or more data structures that may be arranged to include one or more heuristics, formulas, or the like, that may be employed for predictive performance analysis for file systems. Deployment models may be employed to guide or recommend provisioning parameters that may be used to deploy, or otherwise manage a distributed file system.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing file systems over a network. In one or more of the various embodiments, a core specification that defines one or more characteristics of a portion of a file system and one or more parameters may be provided. The one or more characteristics may include one or more storage device characteristics. And, the one or more parameters may include one or more of a cluster size, a protection level, or the like. In one or more of the various embodiments, the one or more storage device characteristics may include one or more of annualized failure rate (AFR), mean time before failure (MTBF), cache information, capacity, data transfer speed, power requirements, or the like.

In one or more of the various embodiments, one or more file system models may be generated based on the core specification and the one or more parameters. Each file system model may correspond to a file system that conforms to a core specification and specific value for the one or more parameters. In one or more of the various embodiments, generating the one or more file system models may include generating one or more of one or more determinative file system models, or one or more probabilistic file system models. The one or more probabilistic file system models may employ one or more of monte carlo simulations.

In one or more of the various embodiments, a simulation engine may be employed to provide one or more simulation results based on the one or more file system models.

In one or more of the various embodiments, one or more deployment models may be generated based on the one or more simulation results. The one or more deployment models may be associated with one or more file system performance characteristics.

In one or more of the various embodiments, the one or more deployment models may be employed to provision one or more file systems that may conform to the one or more file system performance characteristics associated with its corresponding deployment model. In one or more of the various embodiments, generating the one or more deployment models may include: employing one or more functions to generate one or more curves based on the one or more simulation results; rank ordering the one or more curves based on determining a least measure of difference between the one or more curves and the one or more simulation results; determining one or more coefficients that correspond to a top ranked curve; including the one or more coefficients in the one or more deployment models such that the one or more coefficients and the one or more functions may be employed to provide one or more portions of the information used to provision the one or more file systems; or the like.

In one or more of the various embodiments, one or more performance characteristics associated with the one or more provisioned file systems may be monitored. In some embodiments, the one or more deployment models may be scored based on the one or more monitored performance characteristics conforming to the one or more file system performance characteristics associated with the one or more deployment models. And, in some embodiments, one or more reports that include information associated with the scoring of the one or more deployment models may be generated.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, file system management server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, file system management server computer 116, or other computers. Client computers 102-105 may further be configured to include a client application that enables an end-user to log into an end-user account that may be managed by another computer, such as file system management server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, file system management server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1 T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 116 is described in more detail below in conjunction with FIG. 3. Although FIG. 1 illustrates file system management server computer 116, or the like, each as a single computer, the innovations or embodiments are not so limited. For example, one or more functions of file system management server computer 116, or the like, may be distributed across one or more distinct network computers. Moreover, in one or more embodiments, file system management server computer 116 may be implemented using a plurality of network computers. Further, in one or more of the various embodiments, file system management server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
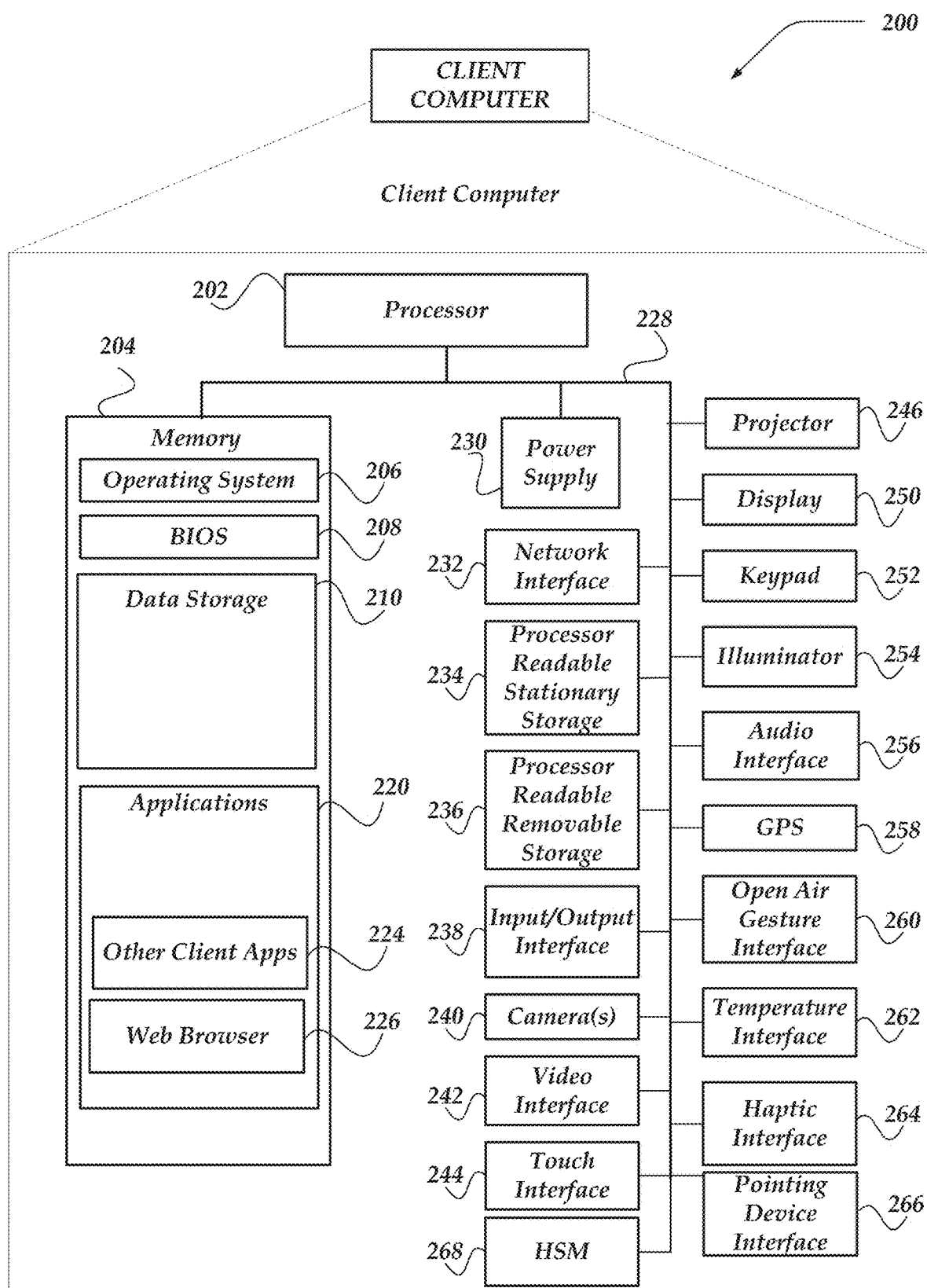
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store key pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
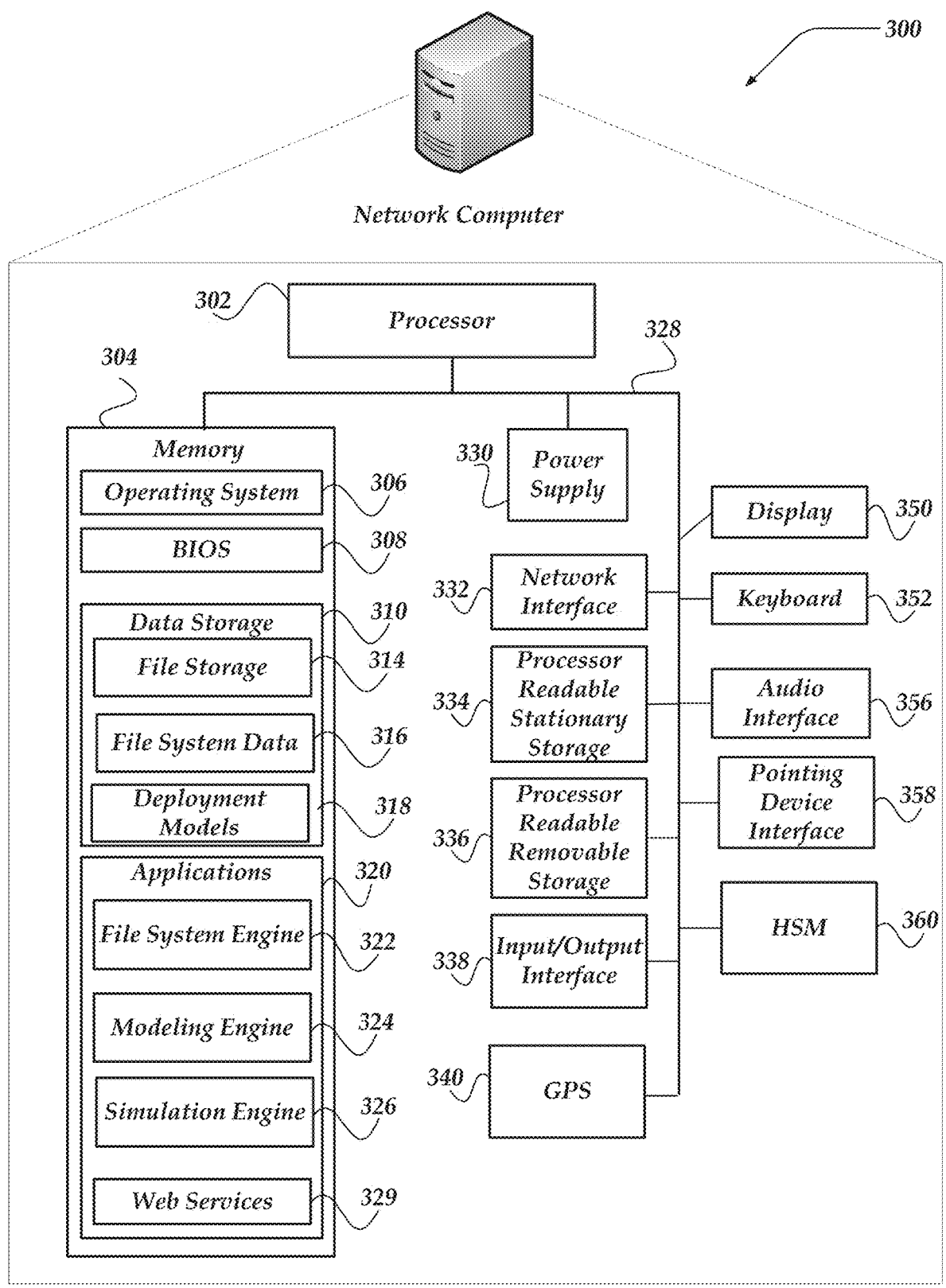
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, modeling engine 324, simulation engine 326, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX, or a specialized operating system such as Microsoft Corporation's Windows® operating system, or Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, modeling engine 324, simulation engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, modeling engine 324, simulation engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, modeling engine 324, simulation engine 326, web services 329, or the like, may be provisioned and de-commissioned automatically.

Also, in one or more of the various embodiments, file system engine 322, modeling engine 324, simulation engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store key pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
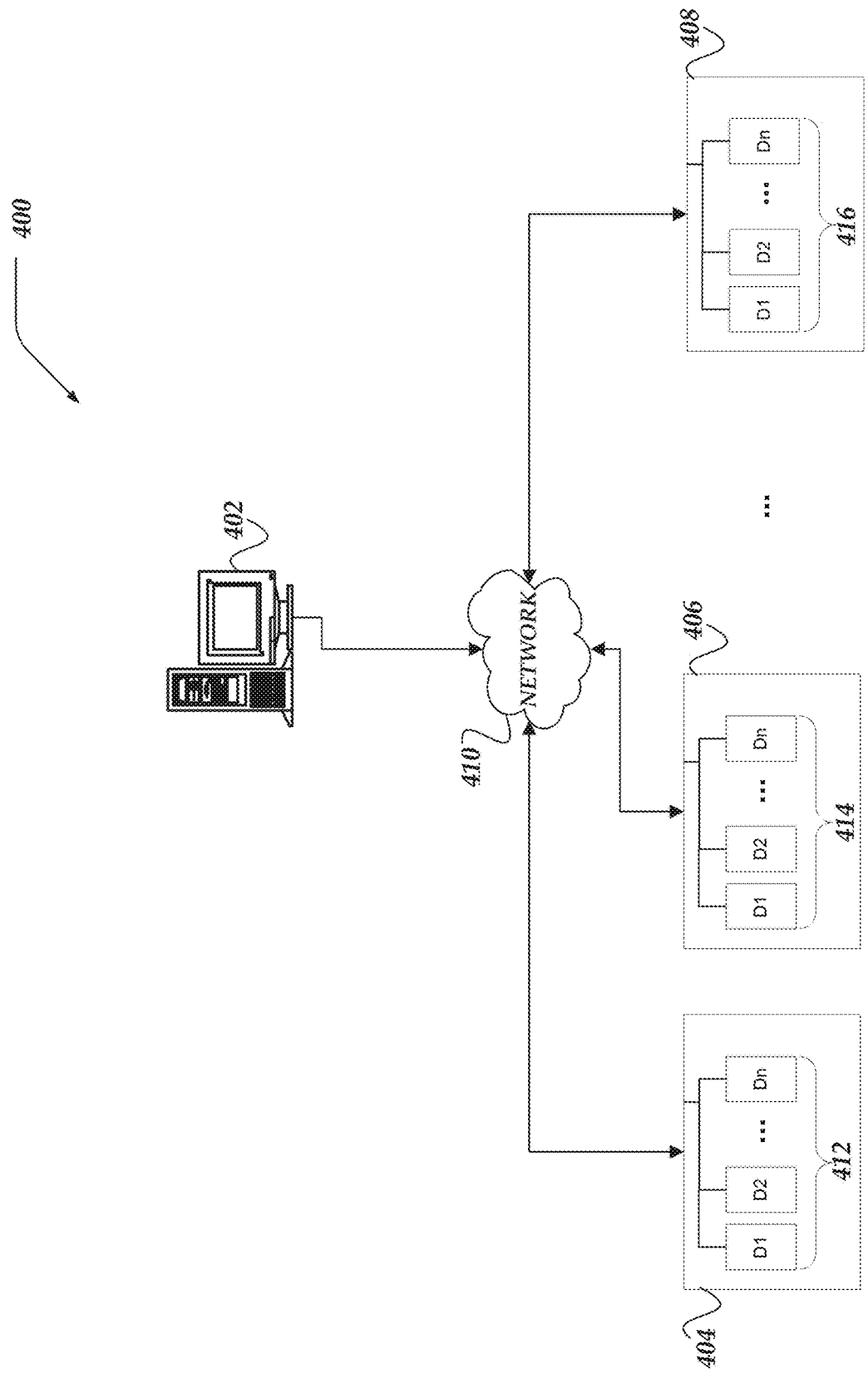
FIG. 4 illustrates a logical architecture of a file system for predictive performance analysis for file systems in accordance with one or more of the various embodiments.

FIG. 4 illustrates a logical architecture of file system 400 for predictive performance analysis for file systems in accordance with one or more of the various embodiments. In at least one of the various embodiments, file system 400 may be comprised of a file system management server computer, such as, file system management server computer 402, as well as, one or more storage computers, such as, storage computer 404, storage computer 406, storage computer 408, or the like. In at least one of the various embodiments, each computer may be interconnected over a network, such as, network 410. In at least one of the various embodiments, network 410 may be considered to be arranged to be similar to wireless network 108 or network 110.

In at least one of the various embodiments, the storage computers may be arranged to include one or more storage devices, such as, storage devices 412, storage devices 414, or storage devices 416. In various embodiments, storage computers may include more or fewer storage devices than illustrated in FIG. 4. In at least one of the various embodiments, storage computers may include a single storage device. And, in some embodiments, one or more storage computers may be arranged to be included in an enclosure or chassis which in turn may be interconnected to other computers and/or storage computers over network 410.

In one or more of the various embodiments, storage computers may be employed to provide a file system object store for storing the file system objects that contain or represent the information stored in file system 400.

In at least one of the various embodiments, the functionality of file system management server computer 402 may be incorporated directly into one or more storage computers, such as, storage computer 404, storage computer 406, storage computer 408, or the like. In such embodiments a file system engine, such as, file system engine 322 may be operative on one or more of the storage computers.

In one or more of the various embodiments, the implementation details that enable file system 402 to operate may be hidden from clients, such that they may be arranged to use file system 402 the same way they use other conventional file systems, including local file systems. Accordingly, in one or more of the various embodiments, clients may be unaware that they are using a distributed file system that supports predictive performance analysis because file system engines may be arranged to provide an interface or behavior that may be similar to one or more standard file systems.

Also, while file system 400 is illustrated as using one file system management computer, the innovations are not so limited. Innovations herein contemplate file systems that include two or more file system management computers or one or more file system object data stores. In some embodiments, file system object stores may be located remotely from one or more file system management computers. Also, a logical file system object store or file system may be spread across two or more cloud computing environments, storage clusters, or the like.

Figure 5:
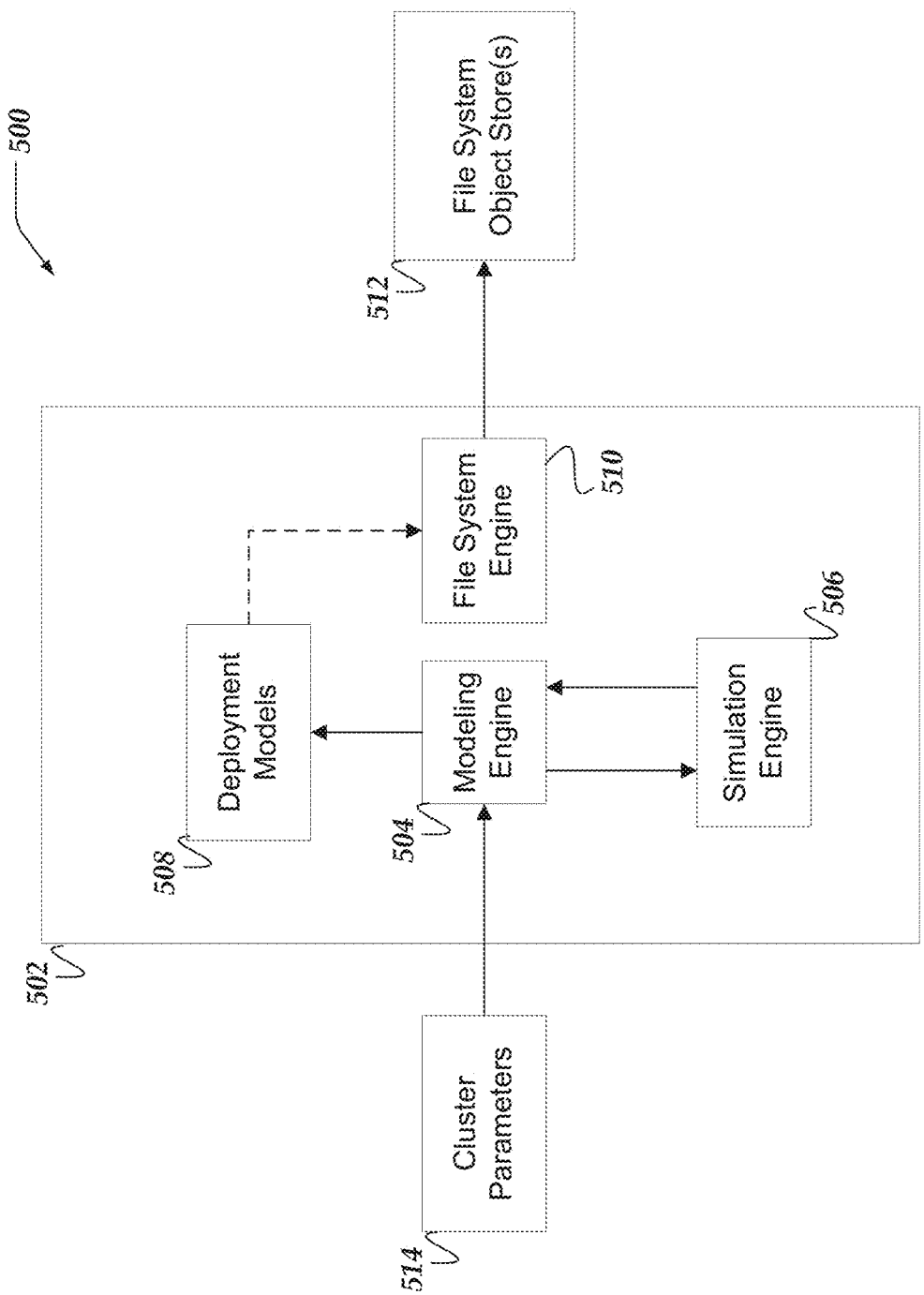
FIG. 5 illustrates a logical schematic of a system for predictive performance analysis for file systems in accordance with one or more of the various embodiments.

FIG. 5 illustrates a logical schematic of system 500 for predictive performance analysis for file systems in accordance with one or more of the various embodiments. In one or more of the various embodiments, system 500 may be comprised of file system management server 502. Accordingly, in one or more of the various embodiments, file system management server 502 may include modeling engine 504, simulation engine 506, deployment models 508, file system engine 510, file system object stores 512 (e.g., storage units), or the like. Also, in one or more of the various embodiments, various cluster parameters, such as, cluster parameters 514 may be provided.

In one or more of the various embodiments, modeling engines, such as, modeling engine 504 may be arranged to perform one or more actions to generate, evaluate, or manage one or more deployment models. Accordingly, in some embodiments, modeling engines may be arranged to employ one or more simulation engines, such as, simulation engine 506, to generate or evaluate one or more deployment models.

In one or more of the various embodiments, simulation engines, such as, simulation engine 506 may be arranged to perform various actions to simulate one or more performance characteristics of a file system based on one or more cluster parameters, one or more deployment models, or the like, or combination thereof.

In one or more of the various embodiments, cluster parameters, such as, cluster parameters 514 represent value for various configuration options for file systems. In one or more of the various embodiments, cluster parameters may be comprised of a core specification and one or more configuration parameters. For example, in some embodiments, cluster parameters may include, number of nodes in a cluster, performance characteristics of storage devices, minimum or maximum performance/operation threshold values, or the like, or combination thereof.

In one or more of the various embodiments, modeling engine 504 may be arranged to employ cluster parameters 514 to generate file system models (not shown) that may be provided to simulation engine 506. Accordingly, in some embodiments, simulation engine 506 may be arranged to perform one or more simulations based on the file system models.

In one or more of the various embodiments, modeling engine 504 may be arranged to generate one or more deployment models (e.g., deployment models 508) based on simulation results provided by simulation engine 506. In one or more of the various embodiments, deployment models may be employed to determine resources or configuration information for one or more file systems that conform to one or more performance characteristics. In one or more of the various embodiments, the particular performance characteristics or the value thereof may vary depending on local requirements or local circumstances.

In one or more of the various embodiments, simulating file system performance based on file system models enables the generation of deployment models that may be used to provision resources for actual file systems that conform to determined performance characteristics (e.g., constrain conditions). For example, performance characteristics may include, Mean Time to Data Loss (MTDL), protection level, recovery impacts, number of nodes, storage device characteristics, or the like.

In one or more of the various embodiments, absent deployment models, file system resources may be provisioned based on ad-hoc or otherwise unreliable methods. For example, in some cases, conventional provisioning methods may result in over provisioned resources to help ensure minimum performance commitments may be met. However, naive over provisioning may introduce other performance problems. For example, naive provisioning methods may suggest that generously adding cluster nodes or protection levels may be a reasonable tactic to guarantee MTDL commitments.

However, other performance factors, such as, overall file system performance may be negatively impacted. For example, naive deployments may meet MTDL requirements at the expense of overall user experience. For example, in some cases, recovery/protection activity may consume an amount of performance capacity such that overall performance of the file system may be degraded while protection information is being rebuilt after device failures.

Likewise, if too much deference is given to some performance metrics, recovery activities may be starved of resources. In some cases, long running recovery actions may not complete before additional failures occur, possibly leading to data loss. For example, if the file system is provisioned with many storage nodes and a high protection level, simultaneous device failure probability may be increased. This may be because as the number of storage units in a file system is increased there is an increased likelihood that one or more storage units will fail during the rebuild period, triggering recovery actions to rebuild the information that was stored on the failed storage units. Accordingly, the longer it takes to replace the failed storage unit and rebuild its data, the more likely another storage unit may fail. However, rebuilding the data for the failed storage unit as fast as possible is likely to negatively impact the overall performance of the file system by allocating all available resources to recovery actions causing unacceptable performance impacts to users.

Accordingly, deploying/provisioning file systems that meet MTDL guarantees and performance requirements may require careful consideration. Further, in one or more of the various embodiments, given the variability in cluster parameter values, such as, cluster node count, storage device specifications, desired protection level, minimum MTDL, or the like, may result in thousands of combinations that each may have different or unanticipated performance characteristics.

Accordingly, in one or more of the various embodiments, system 500 may be arranged to iteratively simulate the performance characteristics of various file system models to provide deployment models that may ensure one or more performance characteristics are met.

In some embodiments, performance characteristics, such as, MTDL, maximum storage device throughput utilization, or the like, may be defined. Thus, in one or more of the various embodiments, simulation engines may execute performance simulations for different cluster parameters to generate deployment models that may be used to deploy file systems that conform to required performance characteristics.

In one or more of the various embodiments, simulation engines, such as, simulation engine 506 may be arranged to perform various types of simulation methods, including probabilistic techniques, such as, monte carlo simulations, or the like. Likewise, in some embodiments, deterministic simulation techniques may be employed. Also, in some embodiments, custom simulation methods may be employed as well. Further, in one or more of the various embodiments, simulation engines may be arranged to support file system models that employ a combination of simulation techniques, including deterministic techniques, probabilistic techniques, heuristics, or the like.

Figure 6A:
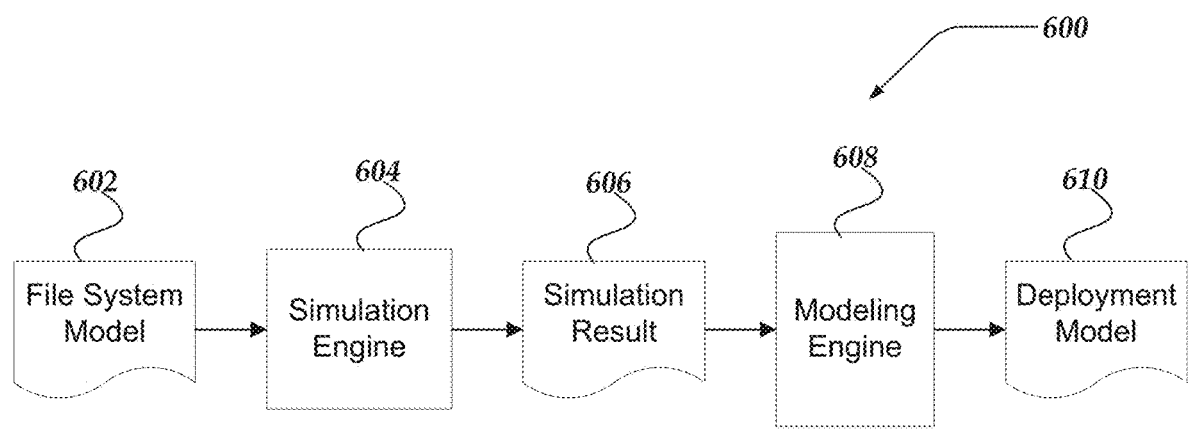
FIG. 6A illustrates a logical schematic of a system for generating deployment models based on simulations in accordance with one or more of the various embodiments.

FIG. 6A illustrates a logical schematic of system 600 for generating deployment models based on simulations in accordance with one or more of the various embodiments. In some embodiments, system 600 may be considered a part of system 500 described above. In this example, system 600 is isolated to provide further brevity and clarity to its description. Though, one of ordinary skill in the art will appreciate that system 600 may be a part of larger, more complete distributed file system, such as, file system 400, or the like.

In one or more of the various embodiments, system 600 includes one or more file system models, such as, file system model 604, one or more simulation engines, such as, simulation engine 604, or the like. Accordingly, in some embodiments, simulation engine 606 may be arranged to generate one or more simulation results, such as, simulation result 606 that may be provided to one or more modeling engines, such as, modeling engine 608. In some embodiments, modeling engine 608 may be arranged to generate one or more deployment models, such as, deployment model 610 based on simulation result 606.

In one or more of the various embodiments, simulation engines may be arranged to support different types of file system models. In some embodiments, file system models may be arranged based on one or more custom or well-known system modeling conventions. Generally, for some embodiments, file system models may be considered models that may be employed to simulate the risk of component failure, time/resources required to recover from failures, or the like.

In one or more of the various embodiments, file system models may include a core specification and a range of parameters. Accordingly, in one or more of the various embodiments, simulation engines may be arranged to simulate file systems comprised of the core specification across the range of parameters.

In one or more of the various embodiments, parameters provided with a core specification may be considered performance or configuration parameters, they may include, number of cluster nodes, protection level, storage configuration, or the like. For example, for some embodiments, a simulation engine may be provided core specification A, plus parameters, such as, a cluster size 4-100, protection level 1-4, or the like. In some cases, parameter values may be associated with additional meta-data, such as, increment size (step values), or in some cases, rather than using a range, multiple values for the same parameter may be explicitly provided, such as, cluster size: [4, 10, 20, 50, 100], or the like.

In some embodiments, file system models may be arranged to enforce or evaluate the performance of file systems under various constraint conditions. In some embodiments, constraint conditions may vary depending on the local circumstances or local requirements. For example, for some embodiments, constraint conditions may include, storage device utilization, storage unit utilization, network utilization, compute/CPU utilization, or the like. Note, one of ordinary skill in the art, will appreciate that constraint conditions may include threshold values, floor values, ceiling values, value ranges, or the like. Also, in some embodiments, constraint conditions may be compound conditions that may be based on more than one sub-conditions, rules, computer readable instructions, or the like. Accordingly, in some embodiments, one or more file system models may include constraint condition information provided via configuration information.

In one or more of the various embodiments, as described above, simulation engines may be arranged to provide simulation results that modeling engines may employ to generate one or more deployment models. In some embodiments, the information or format of simulation results provided by simulation engines may vary depending on the type of model, the type of simulation, modeling engine requirements, or the like. For example, simulation results may be a collection of values, formatted using comma separated values (CSV), JSON objects, XML, stored directly into databases, or the like. In one or more of the various embodiments, the particular result information or format may vary depending on local circumstances or requirements. In some embodiments, system 600 may be arranged to employ configuration information to determine how to coordinate information transfer between simulation engines and modeling engines.

Accordingly, in one or more of the various embodiments, modeling engine 608 may employ the simulation results to generate one or more deployment models. In some embodiments, deployment models may prescribe configuration parameters or rules for deploying file systems predicted to meet various performance requirements based on the simulations. Accordingly, in some embodiments, file systems provisioned or deployed based a deployment model may be expected to meet or exceed to the constraint conditions predicted by the simulations used to generate the deployment model.

Figure 6B:
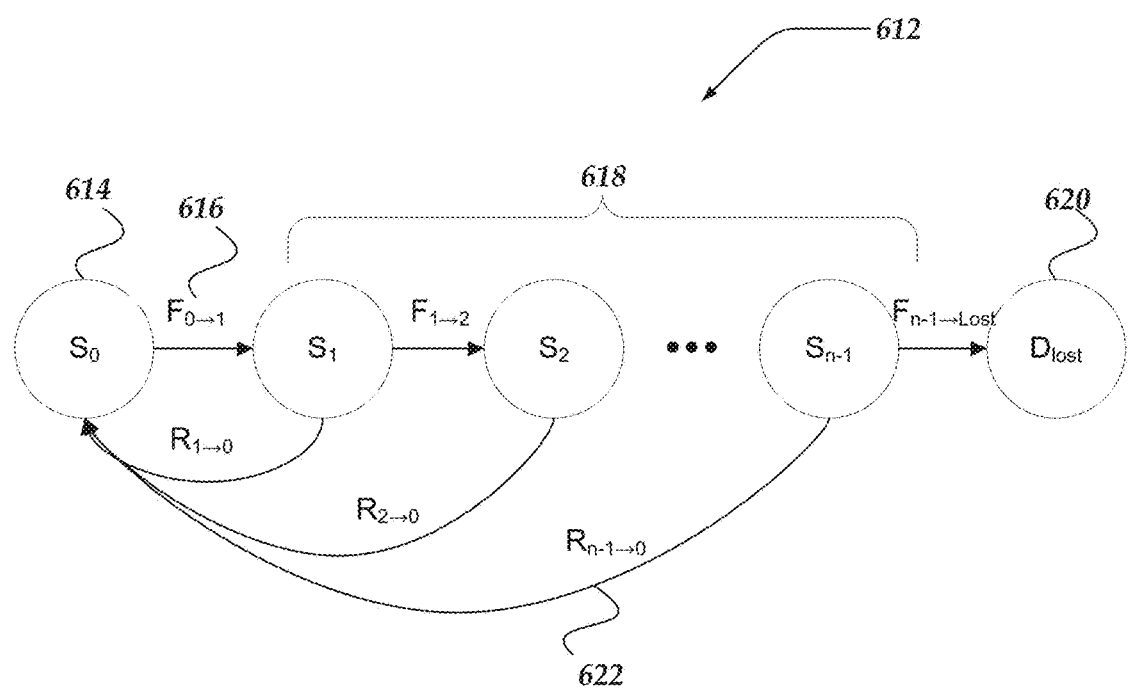
FIG. 6B illustrates a logical representation of a file system model for predictive performance analysis for file systems in accordance with one or more of the various embodiments.

FIG. 6B illustrates a logical representation of file system model 612 for predictive performance analysis for file systems in accordance with one or more of the various embodiments. As described above, the innovations described herein are not limited to a particular type of simulation or file system model as long as they are sufficient for predicting performance for file systems. In some embodiments, simpler, fast-running simulation models may be employed, while in other cases, complex slow-running simulations models may be employed. For example, in some embodiments, one or more fast-executing deterministic models may provide simulation results suitable for generating deployment models. In other cases, the complexity of the file systems being modeled may require probabilistic simulation techniques, such as, monte carlo simulations, or the like.

In this example, file system model 612 may be considered to represent a model suitable for probabilistic simulations. In some embodiments, file system model 612 may include various states, including an initial state, such as, state 614, one or more other states, such as, states 618, and a final data loss state, such as, state 620. In some embodiments, each state transition may be associated with transition function, such as, transition function 616. Likewise, in this example, reset or recovery transitions, such as, recovery transition 622 may represent returning the system to the initial or non-failure state.

As described above, innovations described herein anticipate supporting various models or model types. Accordingly, for brevity and clarity file system model 612 may be considered a simplified representation of a file system model. Thus, in some embodiments, the particular states, number of states, transitions, transition functions, or the like, may be determined based on local circumstances or local requirements. Accordingly, in one or more of the various embodiments, some or all file system models or related parameters, coefficients, transitions, transition functions, or the like, may be provided via configuration information.

Figure 7:
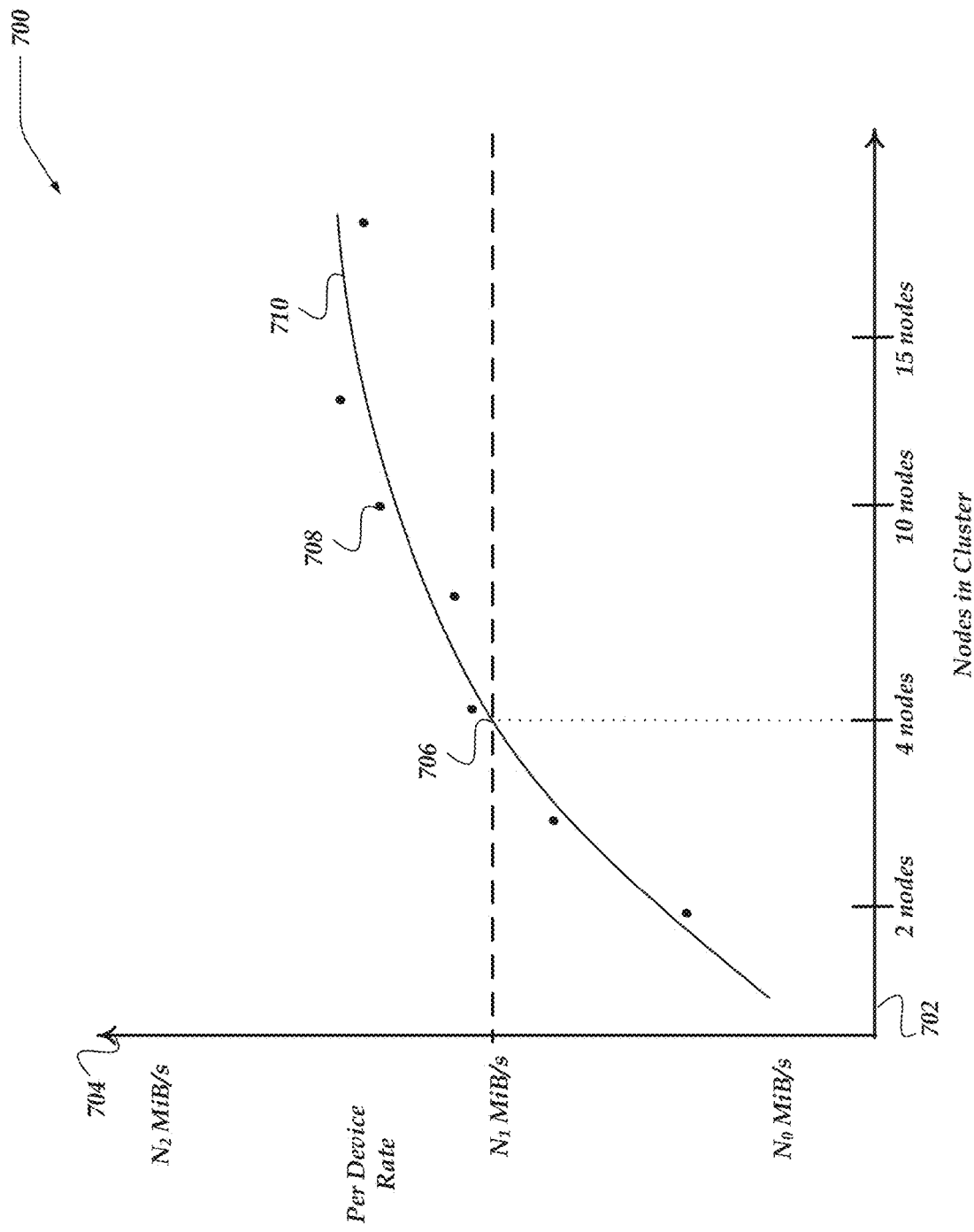
FIG. 7 illustrates a logical representation of a simulation result for predictive performance analysis for file systems in accordance with one or more of the various embodiments.

FIG. 7 illustrates a logical representation of simulation result 700 for predictive performance analysis for file systems in accordance with one or more of the various embodiments. In this example, a simulation engine may have been provided one or more file system models representing a particular file system configuration that has a specified number of cluster nodes. Accordingly, in some embodiments, a simulation engine may execute one or more performance simulations of the one or more file system models to generate simulation results that may be employed for generating deployment models for the particular core specification.

In this example, the X-axis (axis 702) represents the number of nodes in the file system represented by the file system models. And, in this example, the Y-axis (axis 704) represents the required per storage device throughput to stay within the simulation MTDL constraint conditions while not exceeding a defined per-device throughput rate $N_1$ MiB/s. Accordingly, for some embodiments, result 700 shows that for the given core specification, performance requirements may be met as long as the number of cluster nodes does not exceed four. Accordingly, at point 706, simulation result 700 shows that the maximum per-device-data-rate of $N_1$ MiB/s is reached at four nodes. Thus, for this example, while a file system with ten nodes can satisfy the MTDL requirements, it exceeds the per-device-data-rate condition constraint indicating that overall file system performance would be degraded by more than what is deemed acceptable.

In one or more of the various embodiments, result 700 may be comprised of many partial results, such as, partial result 708 that represents an actual partial value produced by a one or more simulation runs. As illustrated here, simulation engines may be arranged to generate results for each cluster configuration for the provided core specifications. Note, in some cases, results may be scattered more than shown here.

Accordingly, in some embodiments, if the generation of partial results may be completed, a modeling engine may be arranged to iterate over various base deployment models to determine a best match to the data generated by the simulation engine. In this example, curve 710 represents a distribution curve that the modeling engine has determined best fits the simulation results.

In some embodiments, modeling engines may be arranged to try to fit various types of distribution curves, such as, polynomial distributions, various power-series distributions, logarithmic distributions, or the like. In some embodiments, modeling engines may be arranged to determine which type of distribution best fits the simulation results based on conventional error evaluation methods, such as, root mean squared error, sum of squares due to error, or the like.

In some embodiments, modeling engines may be arranged to employ one or more base deployment models that define one or more distribution curves to measure against the simulation results. In some embodiments, modeling engines may be arranged to determine one or more the base deployment models based on configuration information, or the like. Likewise, in some embodiments, instructions or rules for error evaluations may be provided via configuration information. Further, in some embodiments, modeling engines may be arranged to employ heuristics, rules, instructions, or the like, provided by configuration information to select base deployment models, fit distribution curves, or the like, to account for local circumstances.

Accordingly, in one or more of the various embodiments, if a modeling engine may determine a distribution curve that is satisfactory, one or more coefficients (e.g., model coefficients) for the selected curve may be determined. Thus, in some embodiments, the model coefficients and a formula of the function associated with the fitted curve may be employed to generate deployment models for file systems. For example, in some embodiments, a function such as A*(node count)^B where A and B are coefficients may be determined for a deployment model based on the simulation results.

Figure 8:
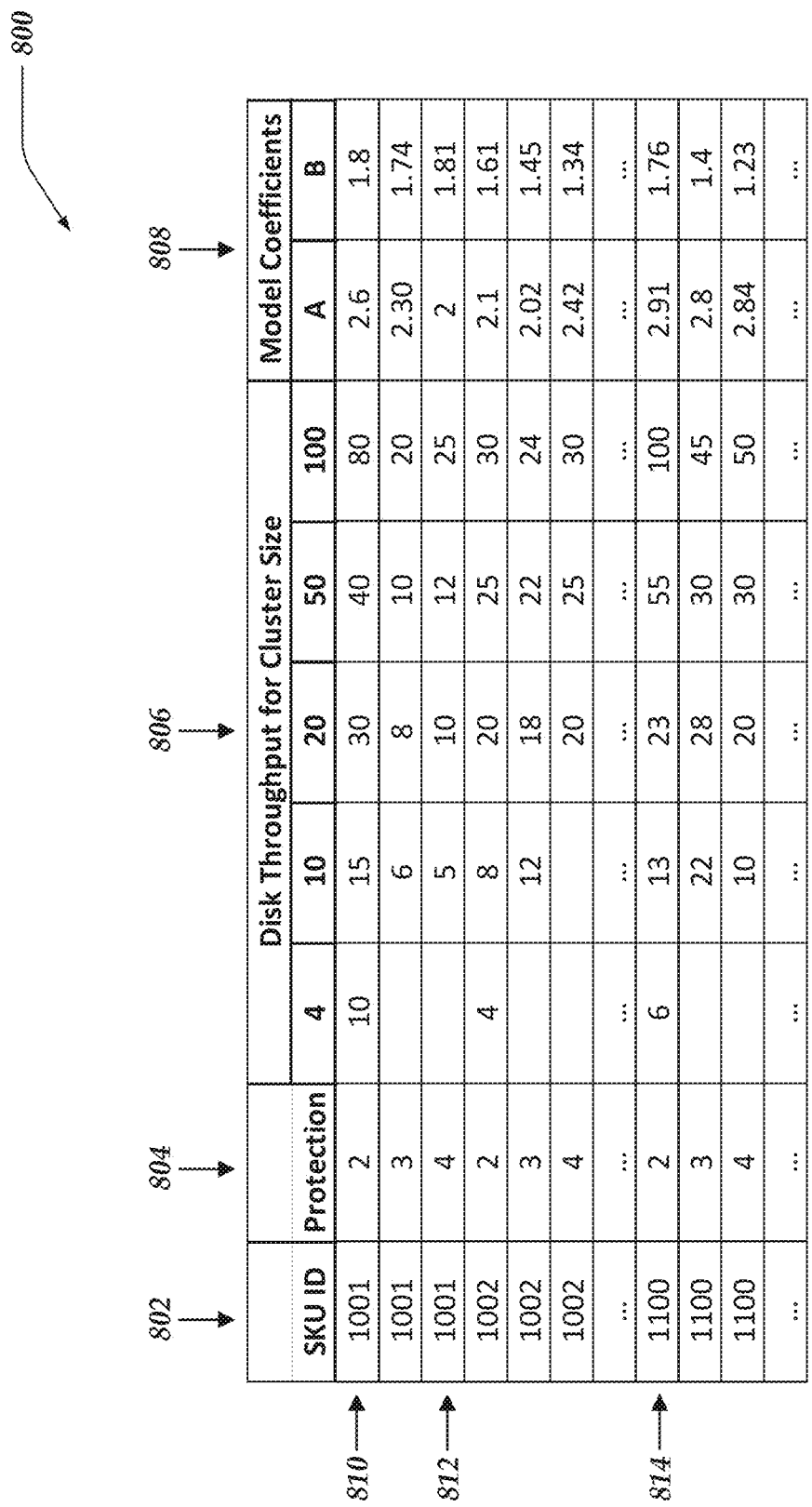
FIG. 8 illustrates a logical representation of deployment models for predictive performance analysis for file systems in accordance with one or more of the various embodiments.

FIG. 8 illustrates a logical representation of deployment models 800 for predictive performance analysis for file systems in accordance with one or more of the various embodiments. As described above, deployment models may be employed to determine the specific configurations for file systems that meet or exceed one or more performance requirements. In this example, for brevity and clarity deployment models 800 are illustrated in a tabular format. One of ordinary skill in the art will appreciate that other data structures or data formats are contemplated. However, one of ordinary skill in the art will appreciate that deployment models 800 is sufficient for describing these innovations.

Accordingly, in this example, each record of deployment models 800 represents a unique deployment model and each column of deployment models 800 may be considered an attribute or condition associated with a given deployment model.

In this example, for some embodiments, deployment models 800 may include columns, such as, SKU ID 802, protection (level) 804, disk throughput 806, model coefficients 808, or the like.

In this example, SKU ID 802 holds values that represent the Store Keeping Unit identifier that may be considered to correspond to a file system core specification. For example, a SKU ID of 1001 may correspond to a file system management server with a particular processor, RAM, network interfaces, paired with a particularly configured storage cluster nodes. Likewise, for example, a SKU ID of 1100 may correspond to a different core specification that may prescribe file system management servers or storage devices with different specifications.

Also, in the example, protection 804 holds a value that indicates the physical protection level associated with a given file system deployment. For example, a protection level of two indicates that the file system may suffer two storage unit failures before there is a loss of data. Generally, each level of protection indicates that one or more storage units (devices or nodes) are being used for storing data protection information, such as, parity information, erasure encoding information, or the like.

Also, in this example, disk throughput 806 shows the per-device data throughput for the given deployment model. In this example, disk throughput is broken out by node counts or cluster sizes of 4 nodes, 10 nodes, 20 nodes, 50 nodes, and 100 nodes.

Further, in this example, model coefficients 808 represents one or more model coefficient values that may be associated with the distribution curve that may correspond to a particular deployment model. In this example, the distribution curve for the deployment models is associated with two coefficients. However, in some embodiments, one or more deployment models may be associated with different distribution curves that may be associated with more or less coefficients.

In one or more of the various embodiments, the coefficient values may be applied to a function, formula, or procedure to produce an instance of the distribution curve that corresponds to one deployment model. For example, if the deployment model represented by row 810 has a distribution curve of Throughput=fn(node count)=A*pow(node count, B) B, the value 2.6 may be substituted for A and the value 1.8 may be substituted for B. Accordingly, in this example, the deployment model corresponding to row 810 may have a distribution curve defined by Throughput=2.6*pow(node count, 1.8).

Accordingly, in one or more of the various embodiments, even though simulation engine simulated performance for 4, 10, 20, 50 and 100 nodes, the deployment model at row 810 may be used to evaluate any node count using the distribution curve formula associated with the deployment model, including node counts that may not have been simulated.

In this example, row 810 represents a deployment model for SKU ID 1001 at protect level 2. Also, in this example, the disk throughput for this deployment model may be determined based on disk throughput for cluster size 806. In this example, the deployment model at row 810 predicts a disk throughput of 10 MiB/s for a four node file system. Likewise, the deployment model at row 810 predicts a disk throughput of 15 MiB/s, and so on. However, at a node count of 50, the deployment model at row 810 predicts a disk throughput of 40 MiB/s. In this example, 30 MiB/s may be considered a constraint condition based on the maximum disk throughput value. Accordingly, in this example, the deployment model at row 810 shows that a node count of 20 or more does not meet the requirement that the per disk throughput remain at or below 30 MiB/s. Thus, in this example, the deployment model at row 810 shows that SKU 1001 at protection level 2 can have at most 20 nodes without exceeding the defined per-disk throughput limit.

Similarly, in this example, the deployment model at row 812 shows that SKU 1001 at protection level 4 can have over 100 nodes in a cluster while still meeting the per-disk throughput requirements. Also, similarly, the deployment model at row 814 shows that SKU 1100 at protection level 2 has a per-disk throughput of 23 MiB/s for 20 nodes in a cluster while still meeting the per-disk throughput requirements. However, in this example, the per-disk throughput limit is defined at 30 MiB/s. Accordingly, the distribution curve function associated with the deployment model may be employed to predict the maximum number of nodes in cluster, which will be some value over 20 nodes depending on the actual distribution curve function associated with the deployment model.

Accordingly, in one or more of the various embodiments, the determination of the model coefficients may reduce the amount of simulation runs required to generate deployment models for different configurations. In this example, the simulation engine would be required to generate simulation results based on node counts of 4, 10, 20, 50, and 100, rather than generating simulation results for node counts of 4-100. Thus, in some embodiments, the resources that may be required for resource intensive simulations, such as, monte carlo simulations based on complex file system models, may be significantly reduced.

Generalized Operations

Figure 9:
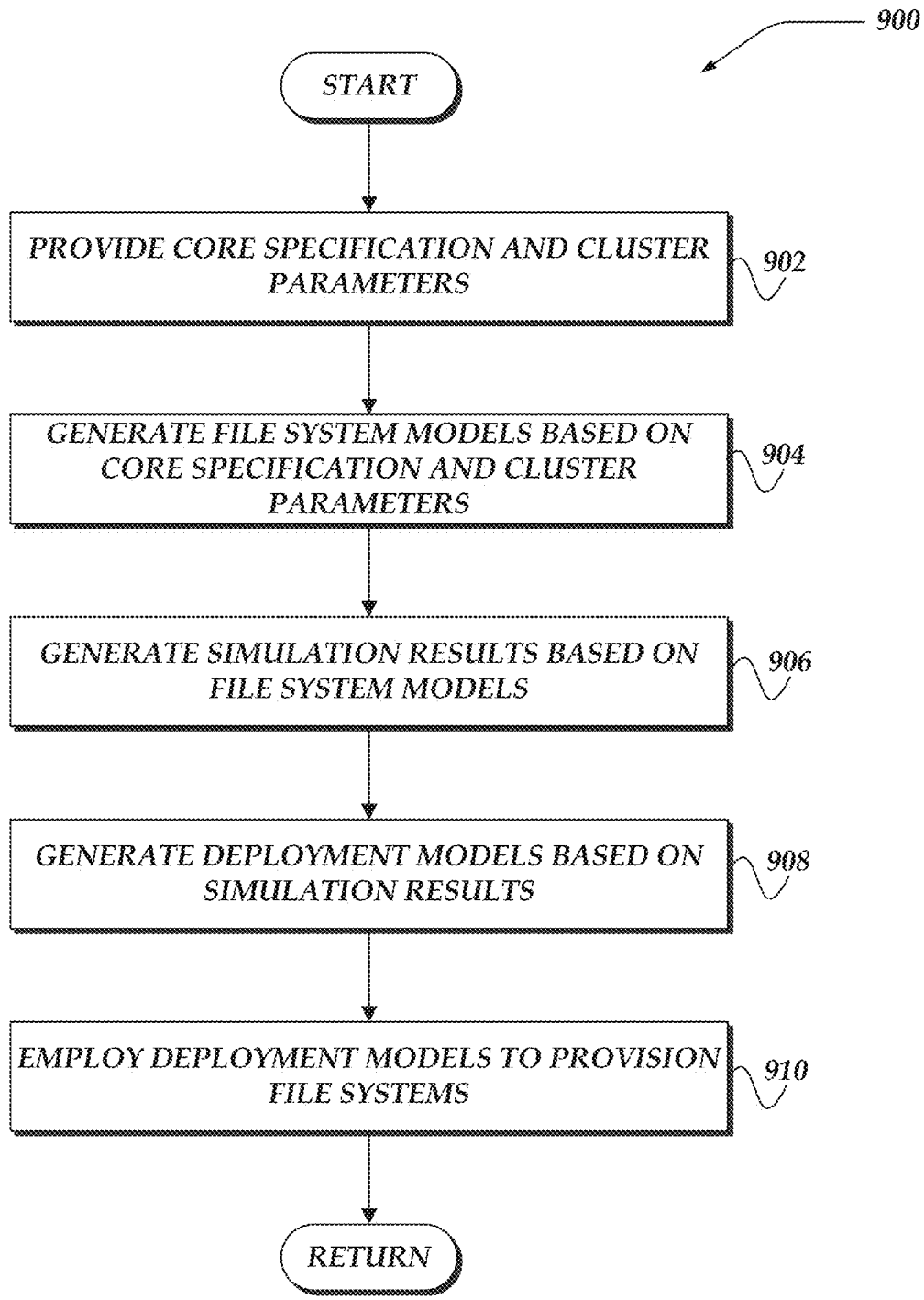
FIG. 9 illustrates an overview flowchart for a process for predictive performance analysis for file systems in accordance with one or more of the various embodiments.
Figure 10:
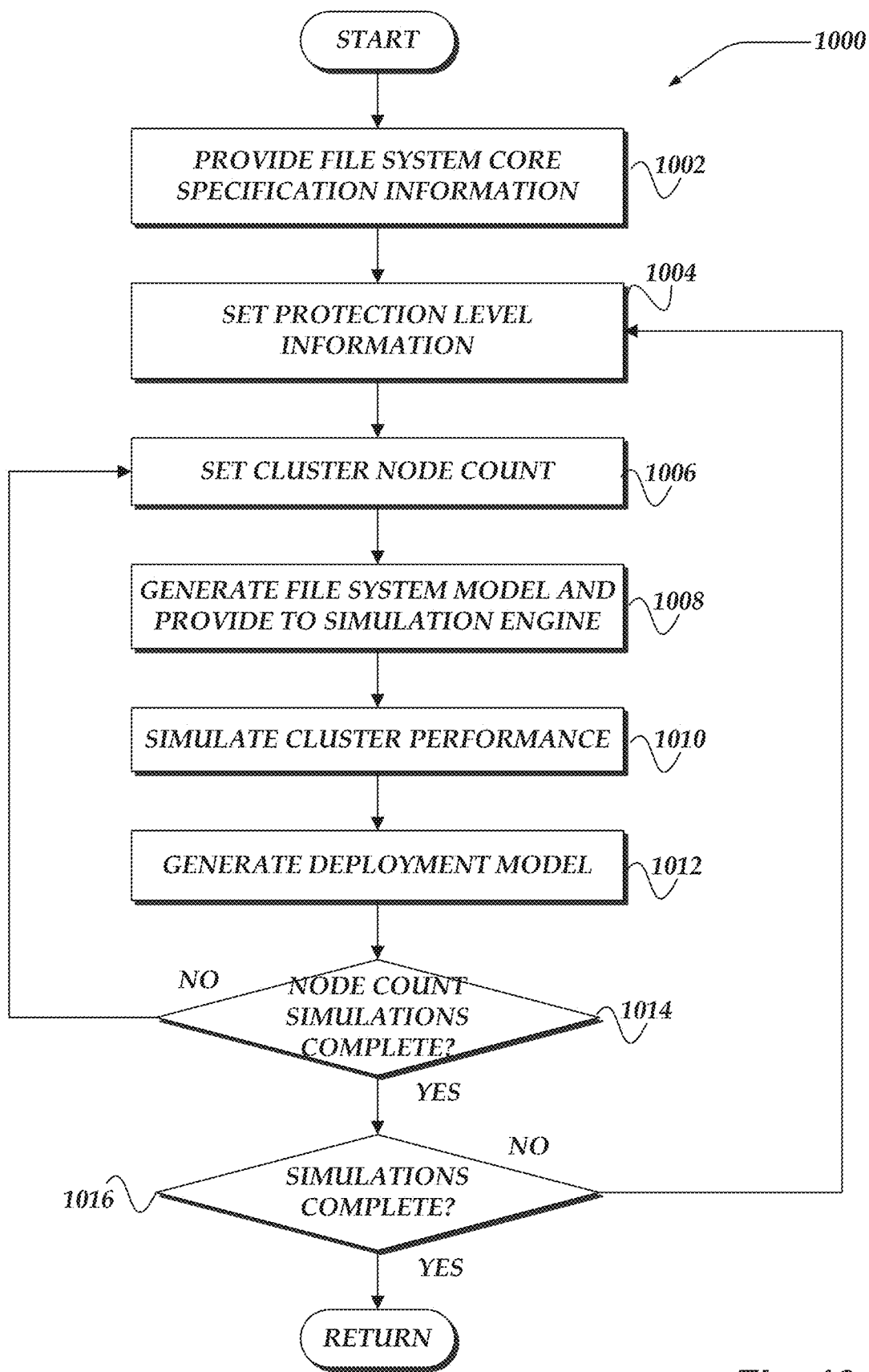
FIG. 10 illustrates a flowchart for a process for predictive performance analysis for file systems in accordance with one or more of the various embodiments.
Figure 11:
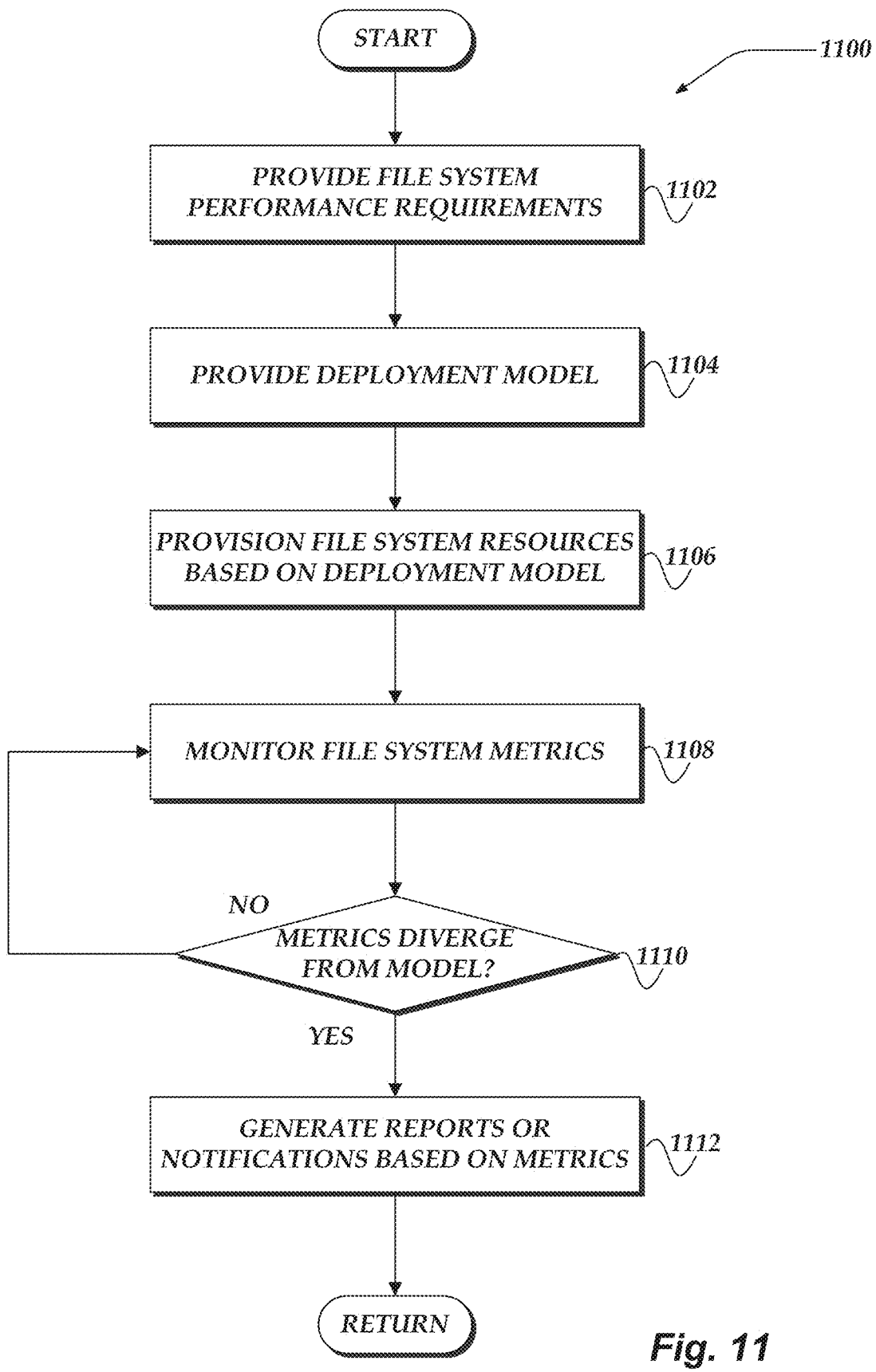
FIG. 11 illustrates a flowchart for a process for provisioning file system resources based on predictive performance analysis for file systems in accordance with one or more of the various embodiments.

FIGS. 9-11 represent generalized operations for predictive performance analysis for file systems in accordance with one or more of the various embodiments. In one or more of the various embodiments, processes 900, 1000, and 1100 described in conjunction with FIGS. 9-11 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-11 may perform actions for predictive performance analysis for file systems in accordance with at least one of the various embodiments or architectures such as those described in conjunction with FIGS. 4-8. Further, in one or more of the various embodiments, some or all of the actions performed by processes 900, 1000, and 1100 may be executed in part by file system engine 322, modeling engine 324, simulation engine 326, or the like.

FIG. 9 illustrates an overview flowchart for process 900 for predictive performance analysis for file systems in accordance with one or more of the various embodiments. After a start block, at block 902, in one or more of the various embodiments, one or more core specifications and cluster parameters may be provided to a modeling engine. As described above, core specifications define the base components of a file system, include file system management server information, storage device information, or the like. Also, in some embodiments, cluster parameters may include protection level, cluster node counts, or the like.

In one or more of the various embodiments, this some or all of this information may be provided via a user interface, or the like. Also, in some embodiments, modeling engines may be arranged to monitor one or more databases or external services to automatically discover the introduction of new or modified core specifications, or the like.

In one or more of the various embodiments, core specifications or cluster parameters may include references (e.g., URIs, API endpoints, or the like) that may be employed by modeling engines to obtain additional specification details. For example, for some embodiments, a core specification may identify the make and model of the storage devices for a file system. Accordingly, in this example, modeling engines may be arranged to retrieve technical performance specifications associated with the identified storage devices from a database or other service rather than having those values included in the core specification itself.

At block 904, in one or more of the various embodiments, the modeling engine may be arranged to generate a file system model based on the provided core specifications or cluster parameters. In some embodiments, modeling engines may be arranged to map information included in core specification or cluster parameters to one or more file system models that may be compatible with a simulation engine. In some embodiments, file system models may be considered data structures that encapsulate some or all of the information or instructions that represent the file system being analyzed.

In some embodiments, one or more simulation engines may support different file system model formats or representations. Accordingly, in one or more of the various embodiments, modeling engines may be arranged to employ rules, computer readable instructions, templates, or the like, provided via configuration information to accommodate local conditions or local circumstances.

At block 906, in one or more of the various embodiments, a simulation engine may be arranged to generate simulation results based on the file system models. In some embodiments, simulation engines may be arranged to run one or more simulations based on file system models. In some embodiments, each simulation may produce result information that represents various performance characteristics of the file system being analyzed. In some embodiments, the specific format or structure of the simulation results may vary depending on the type of simulations that may be performed. Also, in some embodiments, the information included in the results may vary depending on the type of simulation, the file system model, the outcome of the simulations, or the like. In some embodiments, simulation engines may be arranged to employ configuration information to determine how to format results produced by the one or more simulations.

At block 908, in one or more of the various embodiments, the modeling engine may be arranged to generate one or more deployment models based on the simulation results. As described above, modeling engines to match base deployment models with simulation results. In some embodiments, base deployment models may be associated with different types of curve fitting techniques that may be evaluated against the simulation results. Accordingly, in some embodiments, deployment models may be generated based on the best matching base deployment models.

At block 910, in one or more of the various embodiments, the deployment models may be employed to provision one or more file systems. In one or more of the various embodiments, file system engines may be arranged employ deployment models to determine provisioning information for file systems. In some embodiments, such as, cloud computing environments, file system engines may be arranged to automatically provision file system based on deployment models. In other embodiments, file system engines may be arranged to generate provisioning reports that specify file system parameters or configurations based on deployment models.

In some embodiments, currently deployed or provisioned file systems may be compared or evaluated based on deployment models to determine if the currently deployed or provisioned file system conforms to requirements/specifications of relevant deployment models.

In some embodiments, file system engines may be arranged to determine relevant deployment models based on match of the file system requirements or the file system specification (e.g., core specification, plus cluster parameters) to the provisioned/deployment file system.

Next, in one or more of the various embodiments, control may be returned to a calling process.

FIG. 10 illustrates a flowchart for process 1000 for predictive performance analysis for file systems in accordance with one or more of the various embodiments. After a start block, at block 1002, in one or more of the various embodiments, a file system core specification may be provided to a modeling engine. In some embodiments, a file system core specification may include information that specifies the core components of a file system. In one or more of the various embodiments, core components may include file system management servers, make and model of particular storage devices, type or number of network interfaces, or the like. In some embodiments, number of nodes, protection level may be excluded from core specification. Generally, core specifications define immutable features of file system such that changing one or more of these features results in a change to the core specification. In contrast, in some embodiments, while changing protection levels or node counts may modify the performance characteristics of a file system, such changes may not be considered modifications to the core specification of the file system.

In some embodiments, file system core specification information may be associated with an identifier, such as a Stock Keeping Unit (SKU), product identifier, or the like. For example, in some embodiments, an organization may offer various file systems that have different core specifications that may be considered separate products or SKUs.

Accordingly, in one or more of the various embodiments, if a core specification is provided, the performance properties of the associated components may be determined. For example, in one or more of the various embodiments, a modeling engine may be arranged to access a database that stores values for various performance properties associated with the components that may be bundled into a core specification. Thus, citing or providing a particular core specification implies the performance attributes of the bundled components.

At block 1004, in one or more of the various embodiments, the modeling engine may be arranged to set the protection level for the file system being simulated. As described above, file systems may be configured to have different protection levels depending on local needs or requirements. For example, as protection level is increased, a file system may be more resistant to storage unit failure.

In one or more of the various embodiments, core specifications may be associated with a defined range of protection levels. For example, in some embodiments, the protection levels available for a file system core specification may range from 0 through 4. Though, typical core specifications for distributed file systems may be associated with protection levels that range from protection level two to protection level four. Accordingly, in some embodiments, modeling engines or simulation engines may be arranged to determine the range of protection levels for a given core specification based on configuration information or provided parameters.

Accordingly, in one or more of the various embodiments, the protection level may be initialized to the first value in the available protection values for a given core specification. And, subsequently incremented until the maximum value has been simulated.

However, while increasing protection level may increase a file system's resistance to storage unit failures, it reduces the overall storage efficiency because increasing protection levels may require increasing the storage space dedicated to storing data for recovering from failures. For example, in some embodiments, a file system with ten storage units configured for protection level zero implies all ten storage units are available to the file system for general file storage.

However, in the zero protection level example, if one of the storage units fails, the information on that storage unit may be irrevocably lost because there is no recovery information available for restoring the data on the failed storage unit. In contrast, for example, in some embodiments, a file system with ten storage units configured for protection level two implies two of the storage units may be reserved for storing recovery information (e.g., erasure encoding information, or the like) and the remaining eight storage units are available for general storage. Thus, in the protection level two example, the data for two failed storage units may be recovered from the recovery information stored on the storage units reserved as for storing protection information. Accordingly, for example, protection level three means three storage units could fail without data loss and protection level four means four storage units could fail without data loss. However, as protection levels are increased, general purpose storage capacity may be reduced because more storage units are dedicated to storing protection information.

Also, in some embodiments, file system protection level may impact device throughput or introduce other negative network effects. For example, in some embodiments, as the protection levels are increased each write to general storage units in the file system requires additional writes to the storage units used to store protection information associated with the data written to the general storage unit.

At block 1006, in one or more of the various embodiments, the simulation engine may be arranged to set the cluster node count. As described above, performance of file systems with different nodes counts may be simulated. Thus, in some embodiments, each core specification may be evaluated with different node counts. In some embodiments, the available range of node counts may vary depending on the core specification as well as local considerations. Accordingly, in some embodiments, modeling engines or simulation engines may be arranged to employ configuration information to determine the range of node counts for a given core specification.

In some embodiments, simulation of complex models may be resource intensive, especially if the simulations are probabilistic simulations, such as, monte carlo simulations, or the like. simulations. Accordingly, in one or more of the various embodiments, rather than simulating every node count value, the simulation engine may be arranged to simulate particular nodes counts, such as, 4, 8, 16, or the like.

At block 1008, in one or more of the various embodiments, the modeling engine may be arranged to generate a file system model and provide it to a simulation engine. In some embodiments, file system models may be generated based on the core specification, current protection level, current node count, or the like. As described above, a file system model may be a data structure that includes information that may be provided to a simulation engine for simulating the performance characteristics of a particular file system configuration.

In one or more of the various embodiments, the particular format or configuration of a file system model may vary depending on the requirements of the simulation engine. For example, in one or more of the various embodiments, a simulation engine may be arranged to accept file system models that have particular formats for describing attributes of the file system components, including the relationships or interactions between the various components that may be relevant to the simulation.

Accordingly, in one or more of the various embodiments, modeling engines may be arranged to employ rules, templates, computer readable instructions, or the like, provided via configuration information to generate file system models for a particular simulation or simulation engine.

At block 1010, in one or more of the various embodiments, the simulation engine may be arranged to perform one or more actions to simulate the performance of the file system cluster. In the particular actions performed by the simulation engine may depend on the file system model, the type of simulation being executed, or the like.

At block 1012, in one or more of the various embodiments, the modeling engine may be arranged to generate a deployment model based on simulation results.

At decision block 1014, in one or more of the various embodiments, if the node count simulations have been completed, control may flow to decision block 1016; otherwise, control may loop back to block 1006. In some embodiments, for some file system core specifications, the defined range of node counts may be simulated. Accordingly, in some embodiments, if there remain node counts that require simulation, control may loop to block 1006 to advance the node count before running another simulation.

At decision block 1016, in one or more of the various embodiments, if simulations may be complete, control may be returned to a calling process; otherwise, control may loop back to block 1004 to continue performing simulations. For example, if one or more protection levels need to be simulated, process 1000 may loop back to block 1004 to simulate performance characteristics for the next protection level value.

Next, in one or more of the various embodiments, control may be returned to a calling process.

FIG. 11 illustrates a flowchart for process 1100 for provisioning file system resources based on predictive performance analysis for file systems in accordance with one or more of the various embodiments. After a start block, at block 1102, in one or more of the various embodiments, file system performance requirements may be provided to a file system engine. In some embodiments, performance requirements may define minimum or maximum threshold values for various file system characteristics, such as, SKU, node counts, capacity requirements, MTDL requirements, or the like.

In some embodiments, file system engines may be arranged to provide user interfaces that enable users to enter one or more performance requirement values. In some embodiments, the user interfaces may be arranged to enable users to enter quantized inputs, such as, high, medium, low, or the like. Accordingly, in some embodiments, file system engines may be arranged to obtain specific performance requirement values or other specification information from configuration information. In some embodiments, users or organizations may be enabled to set one or more default performance requirements that may be automatically selected.

At block 1104, in one or more of the various embodiments, the file system engine may determine a deployment model based on the provided performance requirements. In some embodiments, file system engines may be arranged to iterate over the available deployment models to determine one or more deployment models that match the provided performance requirements. In some embodiments, modeling engine may be arranged to employ rules, instructions, or the like, provided via configuration information to determine the specific criteria for matching performance requirements to deployment models. For example, in some embodiments, matching rules may be arranged to "round-up" to more capable/expensive file systems while in other cases matching rules may be arranged to match on the nearest/closet match. Further, in one or more of the various embodiments, one or more deployment models may be weighted or prioritized such that they may be preferred over other deployment models that may also match the requested performance requirements.

At block 1106, in one or more of the various embodiments, the file system engine may be arranged to provision file system resources based on the deployment model. In some embodiments, file system engines may be arranged to automatically provision one or more file systems based on the determined deployment models. Also, in some embodiments, file system engines may be arranged to provide a report in a user interface or otherwise that provides the information for provisioning the file systems.

For example, in some embodiments, in a cloud computing environment file system engines may be arranged to automatically provision cloud compute instances and allocation cloud storage space based on the matched deployment models.

Also, in one or more of the various embodiments, file system engines may be arranged to provide user interfaces that enable users to speculatively evaluate proposed file system configurations against deployment models to determine if the proposed file system configuration conforms to one or more deployment models.

At block 1108, in one or more of the various embodiments, file system engines may be arranged to monitor one or more metrics associated with the performance or operation of the file system. In some embodiments, some or all of the metrics or the allowed range of values or threshold values of the metrics may be defined as part of the deployment model. Also, in some embodiments, some or all of the metrics or the allowed range of values or threshold values of the metrics may be defined via configuration information.

At decision block 1110, in one or more of the various embodiments, if one or more of the metrics indicate that the performance or operation of the file system is not conforming to the deployment model or other system requirements, control may flow to block 1112; otherwise, control may loop back to block 1108 for continued monitoring.

At block 1112, in one or more of the various embodiments, file system engines may be arranged to generate one or more reports, notifications, or the like, based on the one or more metrics failing to conform to requirements or expectations associated with the deployment model or the file system in general. In one or more of the various embodiments, file system engines may be arranged to generate the one or more reports or notifications based on rules, instructions, templates, or the like, provided via configuration information. Similarly, in some embodiments, file system engines may be arranged to determine the format, content, audience, responsible user, or the like, for reports or notifications based on configuration information to account for local circumstances or local requirements.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing file systems over a network using one or more processors that execute instructions to perform actions, comprising:
    generating a plurality of file system models based on storage constraint characteristics and configuration information in a file system for each physical core component associated with providing storage for the file system and one or more parameters of one or more portions of the file system, wherein each file system model corresponds to the file system having a particular value for the one or more parameters, and wherein one or more simulation results are provided for each of the file system models, and wherein the storage constraint characteristics include technical performance values determined for a manufacturer and a model for each physical storage device that is a core component associated with providing storage for the file system, and wherein the manufacturer and the model are employed to remotely retrieve the technical performance values from a database or other service;
    employing a core specification to define one or more immutable features of the file system, wherein the core specification specifies a plurality of core components with one or more performance properties that enable operation of the one or more immutable features;
    generating a plurality of deployment models for the plurality of file system models based on the one or more simulation results and each corresponding file system having the particular value for the one or more parameters, wherein each deployment model is associated with one or more file system performance characteristics; and
    employing one or more file system performance requirements to select one or more of the plurality of deployment models to provision one or more file systems having the one or more file system performance characteristics associated with its corresponding deployment model based on the one or more file system performance characteristics including one or more of Mean Time to Data Loss (MTDL), protection level, recovery impact, or number of nodes and also based on one or more of storage device characteristics comprising one or more of annualized failure rate (AFR), mean time before failure (MTBF), cache information, capacity, data transfer speed, and power requirements.

2. The method of claim 1, wherein the one or more parameters include one or more of node counts for a plurality of cluster sizes, or a plurality of protection levels.

3. The method of claim 1, wherein generating the plurality of file system models further comprises:
    providing the core specification that includes one or more characteristics of the one or more portions of the file system, wherein the one or more characteristics include one or more storage device characteristics; and
    employing the core specification and the one or more parameters to generate the plurality of file system models.

4. The method of claim 1, wherein providing the one or more simulation results, further comprises:
    simulating performance of one or more clusters of storage devices having one or more node count sizes and one or more protection levels for each of the file system models.

5. The method of claim 1, further comprising:
    monitoring one or more metrics for the one or more provisioned file systems; and
    in response to one or more metrics diverging from the one or more selected deployment models, generating one or more notifications to a user.

6. The method of claim 1, wherein generating the plurality of file system models, further comprises:
    generating one or more deterministic file system models or one or more probabilistic file system models.

7. The method of claim 1, wherein generating the plurality of deployment models, further comprises:
    determining one or more coefficients that correspond to a top ranked curve generated by one or more functions of the one or more simulation results, wherein the one or more coefficients are included in the plurality of deployment models; and
    wherein the one or more coefficients and the one or more functions are employed to provide one or more portions of the information used to provision the one or more file systems.

8. A network computer for managing file systems over a network, comprising:
a memory that stores at least instructions; and
one or more processors that execute instructions that are configured to cause performance of actions, including:
generating a plurality of file system models based on storage constraint characteristics and configuration information in a file system for each physical core component associated with providing storage for the file system and one or more parameters of one or more portions of the file system, wherein each file system model corresponds to the file system having a particular value for the one or more parameters, and wherein one or more simulation results are provided for each of the file system models, and wherein the storage constraint characteristics include technical performance values determined for a manufacturer and a model for each physical storage device that is a core component associated with providing storage for the file system, and wherein the manufacturer and the model are employed to remotely retrieve the technical performance values from a database or other service;
employing a core specification to define one or more immutable features of the file system, wherein the core specification specifies a plurality of core components with one or more performance properties that enable operation of the one or more immutable features;
generating a plurality of deployment models for the plurality of file system models based on the one or more simulation results and each corresponding file system having the particular value for the one or more parameters, wherein each deployment model is associated with one or more file system performance characteristics; and
employing one or more file system performance requirements to select one or more of the plurality of deployment models to provision one or more file systems having the one or more file system performance characteristics associated with its corresponding deployment model based on the one or more file system performance characteristics including one or more of Mean Time to Data Loss (MTDL), protection level, recovery impact, or number of nodes and also based on one or more of storage device characteristics comprising one or more of annualized failure rate (AFR), mean time before failure (MTBF), cache information, capacity, data transfer speed, and power requirements.

9. The network computer of claim 8, wherein the one or more parameters include one or more of node counts for a plurality of cluster sizes, or a plurality of protection levels.

10. The network computer of claim 8, wherein generating the plurality of file system models further comprises:
providing a core specification that includes one or more characteristics of the one or more portions of the file system, wherein the one or more characteristics include one or more storage device characteristics; and
employing the core specification and the one or more parameters to generate the plurality of file system models.

11. The network computer of claim 8, wherein providing the one or more simulation results, further comprises:
simulating performance of one or more clusters of storage devices having one or more node count sizes and one or more protection levels for each of the file system models.

12. The network computer of claim 8, further comprising:
monitoring one or more metrics for the one or more provisioned file systems; and
in response to one or more metrics diverging from the one or more selected deployment models, generating one or more notifications to a user.

13. The network computer of claim 8, wherein generating the plurality of file system models, further comprises:
generating one or more deterministic file system models or one or more probabilistic file system models.

14. The network computer of claim 8, wherein generating the plurality of deployment models, further comprises:
determining one or more coefficients that correspond to a top ranked curve generated by one or more functions of the one or more simulation results, wherein the one or more coefficients are included in the plurality of deployment models; and
wherein the one or more coefficients and the one or more functions are employed to provide one or more portions of the information used to provision the one or more file systems.

15. A processor readable non-transitory storage media that includes instructions that are configured to cause performance of actions for managing a file system over a network, wherein execution of the instructions by one or more processors on one or more network computers performs actions, comprising:
generating a plurality of file system models based on storage constraint characteristics and configuration information in a file system for each physical core component associated with providing storage for the file system and one or more parameters of one or more portions of the file system, wherein each file system model corresponds to the file system having a particular value for the one or more parameters, and wherein one or more simulation results are provided for each of the file system models; and wherein the storage constraint characteristics include technical performance values determined for a manufacturer and a model for each physical storage device that is a core component associated with providing storage for the file system, and wherein the manufacturer and the model are employed to remotely retrieve the technical performance values from a database or other service;
employing a core specification to define one or more immutable features of the file system, wherein the core specification specifies a plurality of core components with one or more performance properties that enable operation of the one or more immutable features;
generating a plurality of deployment models for the plurality of file system models based on the one or more simulation results and each corresponding file system having the particular value for the one or more parameters, wherein each deployment model is associated with one or more file system performance characteristics; and
employing one or more file system performance requirements to select one or more of the plurality of deployment models to provision one or more file systems having the one or more file system performance characteristics associated with its corresponding deployment model based on the one or more file system performance characteristics including one or more of Mean Time to Data Loss (MTDL), protection level, recovery impact, or number of nodes and also based on one or more of storage device characteristics comprising one or more of annualized failure rate (AFR), mean time before failure (MTBF), cache information, capacity, data transfer speed, and power requirements.

16. The processor readable non-transitory storage media of claim 15, wherein the one or more parameters include one or more of node counts for a plurality of cluster sizes, or a plurality of protection levels.

17. The processor readable non-transitory storage media of claim 15, wherein generating the plurality of file system models further comprises:

providing a core specification that includes one or more characteristics of the one or more portions of the file system, wherein the one or more characteristics include one or more storage device characteristics; and employing the core specification and the one or more parameters to generate the plurality of file system models.

18. The processor readable non-transitory storage media of claim 15, wherein providing the one or more simulation results, further comprises:

simulating performance of one or more clusters of storage devices having one or more node count sizes and one or more protection levels for each of the file system models.

19. The processor readable non-transitory storage media of claim 15, further comprising:

monitoring one or more metrics for the one or more provisioned file systems; and in response to one or more metrics diverging from the one or more selected deployment models, generating one or more notifications to a user.

20. The processor readable non-transitory storage media of claim 15, wherein generating the plurality of deployment models, further comprises:

determining one or more coefficients that correspond to a top ranked curve generated by one or more functions of the one or more simulation results, wherein the one or more coefficients are included in the plurality of deployment models; and wherein the one or more coefficients and the one or more functions are employed to provide one or more portions of the information used to provision the one or more file systems.

\* \* \* \* \*